(12) United States Patent
Yu

(10) Patent No.: US 7,382,789 B2
(45) Date of Patent: Jun. 3, 2008

(54) RESILIENT MULTIPLE SERVICE RING

(75) Inventor: Shaohua Yu, Hubei (CN)

(73) Assignee: Wuhan Fiberhome Networks Co. Ltd., Hubei (CN)

( * ) Notice: Subject to any disclaimer, the term of this patent is extended or adjusted under 35 U.S.C. 154(b) by 776 days.

(21) Appl. No.: 10/504,015

(22) PCT Filed: Feb. 6, 2002

(86) PCT No.: PCT/CN02/00066

§ 371 (c)(1),
(2), (4) Date: Aug. 6, 2004

(87) PCT Pub. No.: WO03/067843

PCT Pub. Date: Aug. 14, 2003

(65) Prior Publication Data

US 2005/0063396 A1 Mar. 24, 2005

(51) Int. Cl.
*H04L 12/56* (2006.01)
(52) U.S. Cl. .................... 370/401; 370/466; 370/469
(58) Field of Classification Search ............... 370/403, 370/254, 228, 476, 466, 469; 709/201
See application file for complete search history.

(56) References Cited

U.S. PATENT DOCUMENTS

| 5,524,212 | A | * | 6/1996 | Somani et al. ............... 711/121 |
| 6,151,641 | A | * | 11/2000 | Herbert ........................ 710/22 |
| 6,163,527 | A | * | 12/2000 | Ester et al. .................. 370/228 |
| 6,487,177 | B1 | * | 11/2002 | Weston-Dawkes .......... 370/254 |
| 6,765,928 | B1 | * | 7/2004 | Sethuram et al. ........... 370/476 |
| 2004/0252688 | A1 | * | 12/2004 | May et al. ................... 370/389 |
| 2006/0224659 | A1 | * | 10/2006 | Yu ............................. 709/201 |

FOREIGN PATENT DOCUMENTS

| EP | 1076468 | 2/2001 |
| EP | 1083706 | 3/2001 |

OTHER PUBLICATIONS

Widjaja et al., "Communications Networks: Fundamental Concepts and Key Architectures", 2000, McGraw-Hill, p. 200.*
Yu, "Draft New Recommendation X.86 on Ethernet over LAPS", International Telecommunications Union, Apr. 2000, all pages.*
Aybay et al., "An Introduction to Resilient Packet Ring Technology", Resilient Packet Ring Alliance, Oct. 2001, all pages.*

* cited by examiner

*Primary Examiner*—Hassan Kizou
*Assistant Examiner*—Jeffrey M Rutkowski
(74) *Attorney, Agent, or Firm*—Fish & Richardson P.C.

(57) ABSTRACT

A data transmission apparatus and method used in resilient multiple service ring, including a first working ring and a second working ring, for transmitting data between physical layer side device and network layer device or other upper layer facilities, such as carrier class node equipments, core and edge routers, switch devices, IP based network accessing equipments, line cards, and interfacing units used in high rates or low rates, e.g. Ethernet, Gigabit Ethernet, 10 Gigabit, Ethernet, DVB (MPEG1, MPEG2, MPEG4 and MPEG7), ATM, Packet over SDH/SONET transmissions, other MSR, RPR for adapting IP and various tributaries (Ethernet,) directly to SDH/SONET or simplified SDH/SONET, or Gigabit Ethernet, 10 Gigabit Ethernet, or other physical layer devices.

42 Claims, 15 Drawing Sheets

SDH/SONET based ADM (Add and Drop Multiplex) Ring

The relationship between Ethernet frame and LAPS and SDH/SONET

Network Topology of Resilient Packet Ring

The Topology of Multiple Services Ring

Tx and Rx Diagram of MSR Node

Protocol Stack of Ethernet over SDH/SONET using MSRP in SDH/SONET based Aggregate Pipe Protocol Stack of DVB frame over SDH/SONET in SDH/SONET based Aggregate Pipe Protocol Stack of POS frame over SDH/SONET in SDH/SONET based Aggregate Pipe Protocol Stack of ATM frame over SDH/SONET in SDH/SONET based Aggregate Pipe Protocol Stack of IP over SDH/SONET using MSRP in SDH/SONET based Aggregate Pipe, it will be used to network management, control signalling and Layer 3 forwarding packet Protocol Stack of Ethernet over 10GE in GE/10GE based Aggregate Pipe Protocol Stack of DVB frame over 10GE in GE/10GE based Aggregate Pipe Protocol Stack of POS frame over GE/10GE in GE/10GE based Aggregate Pipe Protocol Stack of ATM frame over 10GE in GE/10GE based Aggregate Pipe Protocol Stack of IP over Ethernet in 10GE based Aggregate Pipe, it will be used to network management, control signalling and Layer 3 forwarding packet Generic Protocol Stack of MSR Generic Packet Format of MSR Generic Format of CS & NM Packets Multicasting/Broadcasting Mode Unicasting Mode TSNi ID=NA+TT+TSN

Expressions of TSN ID and TCCR ID

Transmitter diagram of scrambling

Receiver diagram of scrambling

RESILIENT MULTIPLE SERVICE RING

FIELD OF THE INVENTION

The present invention relates to data networking and open system communications related to Internet/Intranet, and specifically, relates to a data transmission, switching and other processing apparatus and method for transmitting data between physical layer side device and network layer device or other upper layer facilities, such as carrier class node equipments, core and edge routers, switch devices, IP based network accessing equipments, line cards, and interfacing units used in high rates or low rates, e.g. Ethernet, Gigabit Ethernet, 10Gigabit Ethernet, DVB (MPEG1, MPEG2, MPEG4 and MPEG7), ATM, Packet over SDH/SONET transmissions, other MSR, RPR for adapting IP and various tributaries (Ethernet,) directly to SDH/SONET or simplified SDH/SONET, or Gigabit Ethernet, 10Gigabit Ethernet, or other physical layer devices.

BACKGROUND ART

ITU-T G.707 describes the advantages offered by SDH and multiplexing method, and specifies a set of SDH bit rates, the general principles and frame structure of the network node interface(NNI), the overall frame size of 9 rows by N*270 columns, the section overhead(SOH) together with its byte allocation, arrangements for international interconnection of synchronous transport modules (STMs), the formats for multiplexing and mapping elements into the STM-N at the NNI.

The North America equivalent of SDH is SONET. SONET is the U.S.(ANSI) standard for synchronous data transmission on optical media. People ensure standards so that digital networks can interconnnect internationally and that existing conventional transmission systems can take advantage of optical media through tributary attachments. SONET defines a base rate of 51.84 Mbps and a set of multiples of the base rate known as Optical Carrier Levels. The SONET is an octet-synchronous multiplex scheme that defines a family of standard rates and formats. Despite the name, it is not limited to optical links. Electrical specifications have been defined for single-mode fiber, multi-mode fiber, and CATV 75 ohm coaxial cable. The transmission rates are integral multiples of 51.840 Mbps, which may be used to carry T3/E3 bit-synchronous signals. It is also strong recommended to use G.703 E1/E3/E4/T1/E2/T4 interfaces as physical layer of IP-over-SDH/SONET. It is convenient user access way via LAN.

Both SDH and SONET provide standard for a number of line rates up to the maximum line rate of STM-192/OC-768. Actual line rates approaching 40 gigabits per second are possible.

When SDH/SONET ADM (Add and Drop Multiplex) is applied in a ring shown in FIG. 1, there exist the following defects:
(1) Long configuration cycle is needed for end-to-end trail connection of High Order Virtual Container and Low Order Virtual Container via DCC (data communication channel) (Regeneration section D1-D3 bytes, Multiplex section DCC D4-D 12 bytes);
(2) There are multiple equipment layers: Regeneration section, Multiplex section, High Order Virtual Container and Low Order Virtual Container. So developed system and network is complicated so much.
(3) It is expensive and inefficient for packet to map to HOVC (High Order Virtual Container), LOVC (Low Order Virtual Container) or their contiguous concatenation and virtual concatenation of SDH/SONET systems.
(4) Support of synchronous clock network is needed heavily, otherwise performance of system will be degraded or go down.
(5) Support of TMN (telecom management network) is also needed, otherwise it is no way for interworking for maintenance and operation with other vendors product.

When LAPS (Link Access Procedure—SDH/SONET) in X.86/Y.1323 or GFP (Generic Framing Procedure) is applied for Ethernet over SDH/SONET in a ring of SDH/SONET ADM (Add and Drop Multiplex) shown in FIG. 1 and FIG. 2, there exist the following defects:
(1) Bandwidth of Generic Framing Procedure and Ethernet/Gigabit Ethernet is mismatched. The use of virtual concatenation of HOVC and LOVC increases the complexity of equipment.
(2) It is difficult to implement dynamic bandwidth allocation of packet based.
(3) Only point-to-point connection is supported. It is no way to provide multicast and broadcast functions.

When RPR (Resilient Packet Ring, shown in FIG. 3) is applied in MAN (Metro Network Area) shown in FIG. 3, there exist the following defects:
(1) It is difficult to implement functions of Adding and dropping tributary for renting.
(2) Accessing to RPR node needs layer 3 forwarding of network processor or Layer 3 packet switching (e.g. crossbar, shared memory etc). Cost of node equipment is very high.
(3) Support of multiple services (Ethernet, Gigabit Ethernet, DVB etc) in a node of ring needs to be located to everything over IP. So the use of multiple protocol layers will lead to difficulty in performance.
(4) RPR does work by sending data packets in outer ring and corresponding control packet in inner ring, and data packets in inner ring and corresponding control packet in outer ring. But in case of single fiber cut (e.g. outer ring), corresponding control packet sending in an inner ring does not know that.

SUMMARY OF THE INVENTION

The object of the present invention is to provide Multiple Service Ring (MSR) and associated protocol. MSR is a bi-directional symmetric counter-rotating fiber rings consisted of at least two nodes and it can provide Ethernet, Gigabit Ethernet, DVB, ATM, POS Tributary services (looks like add and drop multiplex of SDH/SONET) in the way of point-to-point full-duplex, unicasting, multicasting and broadcasting when it works as dynamic (data) packet ring of Ipv4/Ipv6 routers. A MSR node in a ring can take a role of RPR if all configuration of tributary is off. A MSR node in a ring can also take a role of SDH/SONET ADM (add and drop multiplex) if all bandwidth of aggregate pipe is used to tributary services. STM-16/OC-48 and STM-64/OC-192 of SDH/SONET (or its contiguous concatenation and virtual concatenation or high order VC), GE or 10GE can be taken as transport channel (aggregate pipe) of MSR. Layer 2 protection switching, topology discovery, dynamic node insertion and deletion, fault and performance management are supported in this Technology.

The present invention provides a data transmission apparatus used in a node of a multiple service ring including at least two nodes, said apparatus comprising: a first working ring input for receiving data frames including a destination node address, a service type identifier, and a first actual data, from a first upstream neighbor node; a first Rx framing means for deframing said data and extracting said destination node address, said service type identifier, and the first actual data; a first RX filtering means for identifying whether said data are for the local node according to said destination address; a first receiving service processing means for determining the service type destined for said data based on said service type identifier when said data are for the local node; a tributary Tx framing means for converting said data to a format of a service specified by said service type; and at least one tributary output for outputting the converted data to a tributary service corresponding to said service type.

The present invention further provides a resilient multiple service ring system comprising a plurality of nodes, each node including a data transmission apparatus as above, wherein each of said nodes is assigned a node address(NA), and data incoming to a node contains a destination node address, and said destination node address is XOR'ed with the NA of the local node to check for match or mismatch.

The present invention further provides a data transmission method used in a node of a multiple service ring including at least two nodes, comprising the steps of: receiving data frames including a destination node address, a service type identifier, and actual data, from a upstream neighbor node via a first working ring input; deframing said data and extracting said destination node address, said service type identifier, and the first actual data; performing Rx filtering to identify whether said data are for the local node according to said destination address; determining the service type destined for said data based on said service type identifier when said data are for the local node; converting said data to a format of a service specified by said service type; and outputting the converted data to one of the multiple tributary service corresponding to said service type.

BRIEF DESCRIPTION OF THE DRAWINGS

The present invention is illustrated by way of example and not limited by the figures of the accompanying drawings, in which like references indicate similar elements and in which.

DETAILED DESCRIPTION OF THE PREFERRED EMBODIMENTS

Introduction

Figure 1:
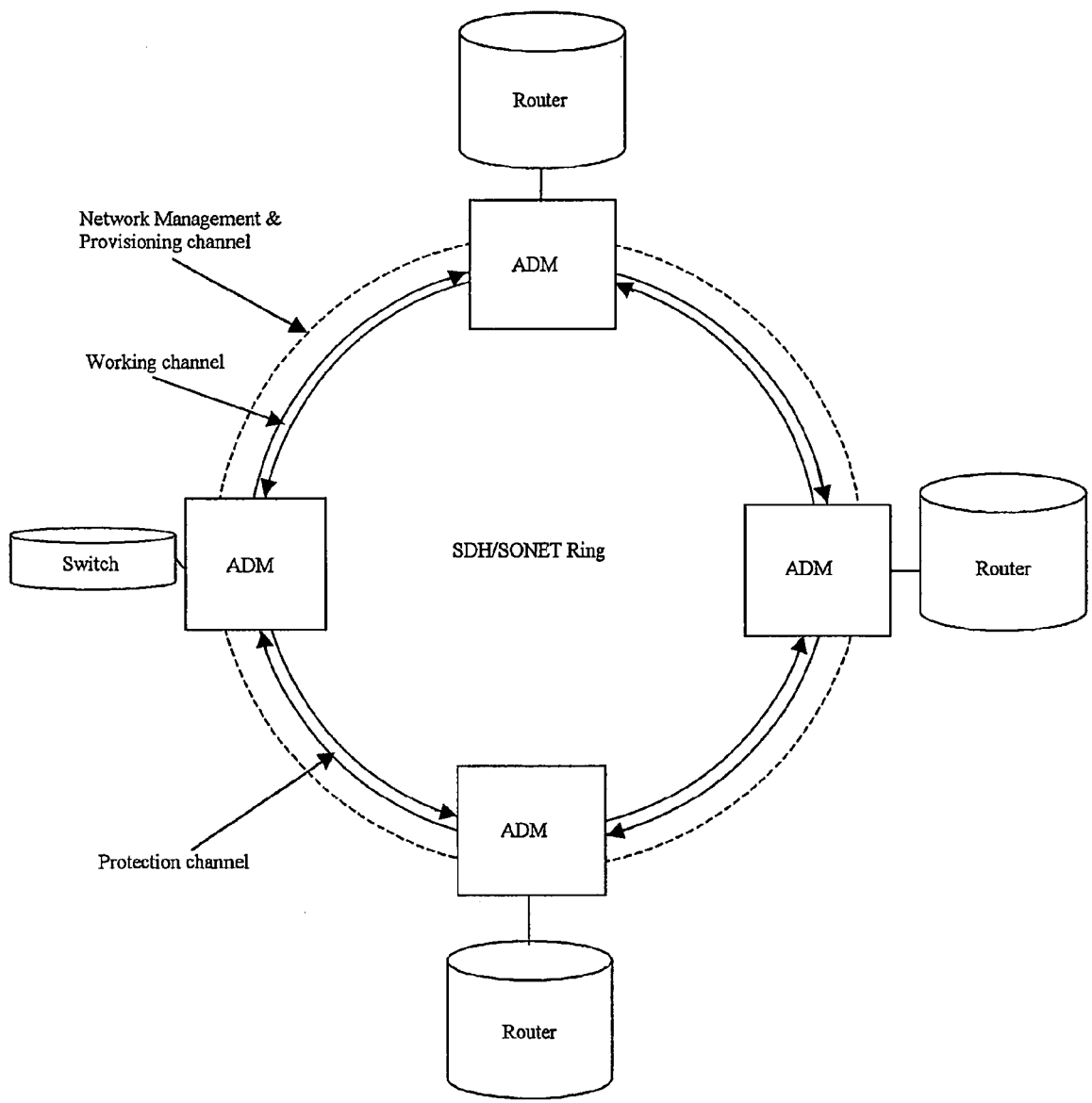
FIG. 1 illustrates the SDH/SONET based ADM (Add and Drop Multiplex) Ring.
Figure 2:
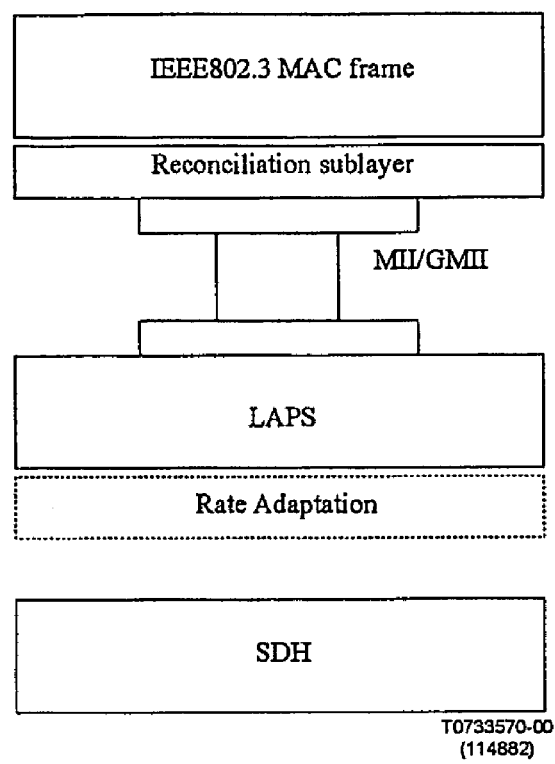
FIG. 2 illustrates The relationship between Ethernet frame and LAPS and SDH.
Figure 3:
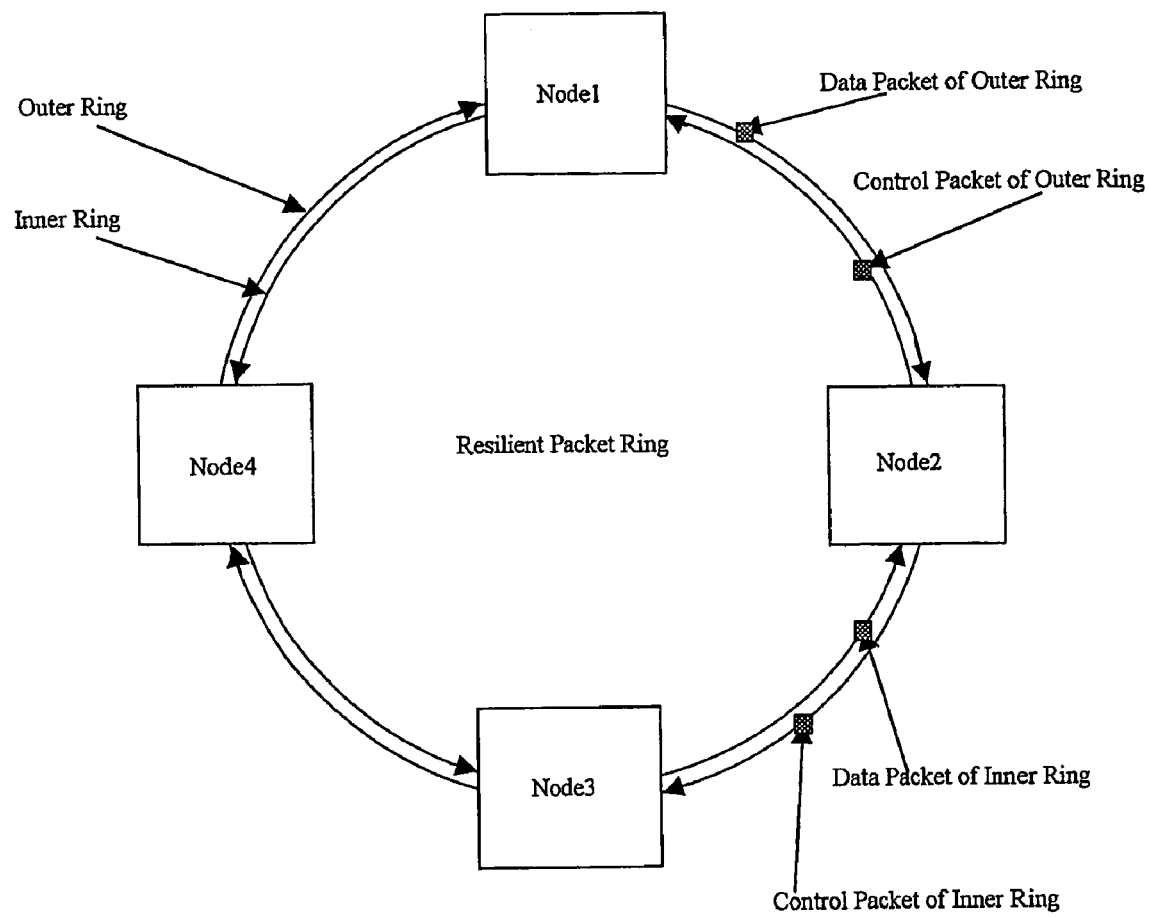
FIG. 3 is Network Topology of Resilient Packet Ring (RPR)

The Internet market has been growing at a great rate. Growth is a basic issue that caused a need for adding the new network topology and architecture in order to provide carrier class broadband services. The existing SDH/SONET is a worldwide and accepted transport architecture, has good performance monitoring of regeneration section, multiplex section and path level, and self-healing. But the expensive cost per bandwidth unit, inefficient combination with the service of packet based, multiple equipment layers, long configuration period are problems still. X.86/Y.1323 on Ethernet over LAPS is a point-to-point solution. The use of High-order and Low-order virtual concatenation increases complexity and cost of application. This Technology introduces MSR (multiple Services Ring) as a new network topology and architecture. It has features of carrier class for IP networks, improving network cost via layer elimination, reducing line and equipment failures, bandwidth efficiency and compatibility with existing technologies.

Multiple Services Ring

1 Scope

This Technology provides Multiple Services Ring (MSR) architecture and associated protocol specification. MSR is a bi-directional symmetric counter-rotating fiber rings consisted of at least two nodes (refer to FIG. 4), each node could add and drop one or more independent Tributary (e.g. Ethernet, Gigabit Ethernet, DVB, POS and/or ATM ports, also could transmit and receive Layer 3 (Ipv4/Ipv6 packets) forwarding data packet Oust like router), Control Signalling Packet and Network Management Packet. MSR supports multicast and broadcast of these service. Aggregate pipe can be any kind of STM-4/OC-12, STM-16/OC-48, STM-64/OC-192, Gigabit Ethernet and 10Gigabit Ethernet. A node can be inserted or removed online form the ring while other nodes and services will be operated normally without packet loss and service loss.

This Technology does not provide the method of mapping MSR protocol to SDH/SONET or Ethernet. No change is made for all Ethernet-based protocols (including IEEE 802.3 Ethernet), all SDH/SONET standards, ATM and POS standards and ETSI DVB specifications.

2 References

The following ITU-T Recommendations, and other references contain provisions which, through reference in this text, constitute provisions of this Invention. At the time of publication, the editions indicated were valid. All Recommendations and other references are subject to revision: all users of this Invention are therefore encouraged to investigate the possibility of applying the most recent edition of the Recommendations and other references listed below. A list of currently valid ITU-T Recommendations is regularly published.

2.1 ITU-T Recommendations

[1] ITU-T Recommendation X.85/Y.1321, *IP over SDH using LAPS*.
[2] ITU-T Recommendation X.86/Y.1323, *Ethernet over LAPS*.
[3] ITU-T Recommendation X.211 (1995) 1 ISO/IEC 10022 (1996), *Information technology—Open Systems Interconnection—Physical service definition*.
[4] ITU-T Recommendation X.212 (1995) 1 ISO/IEC 8886 (1996), *Information technology—Open Systems Interconnection—Data link service definition*.
[5] ITU-T Recommendation G.707 (1996), *Network node interface for the synchronous digital hierarchy (SDH)*.
[6] ITU-T Recommendation G.708 (1999), *Sub STM-0 network node interface for the synchronous digital hierarchy (SDH)*.
[7] ITU-T Recommendation G.957 (1995), *Optical interfaces for equipments and systems relating to the synchronous digital hierarchy*.
[8] ITU-T Recommendation X.200 (1994) 1 ISO/IEC 7498-1 (1994), Information technology—*Open System Interconnection—Basic reference model: The basic model*.
[9] ITU-T Recommendation H.261 (1993), *Video codec for audiovisual services at p×64 kbit/s*.
[10] ITU-T Recommendation H.262 (1995), Information technology—*Generic coding of moving pictures and associated audio information: Video Common text with ISO/IEC*.
[11] ITU-T Recommendation I.321 (1991), B-ISDN protocol reference model and its application.
[12] ITU-T Recommendation I.361 (1999), B-ISDN ATM Layer specification.

2.2 IEEE Specifications

[13] IEEE 802.3 *CSMA/CD Access Method and Physical Layer Specifications*, 1998 Edition.

2.3 ETSI Specifications

[14] EN 300 429: "Digital Video Broadcasting (DVB); Framing structure, channel coding and modulation for cable systems".
[15] EN 300 814: "Digital Video Broadcasting (DVB); DVB interfaces to Synchronous Digital Hierarchy (SDH) networks".
[16] EN 500 83: "Cabled distribution systems for television, sound and interactive multimedia signals; Part 9: Interfaces for CATV/SMATV headends and similar professional equipment for DVB/MPEG2 transport streams" (CENELEC)".
[17] ETR 290: "ETR 290: "Digital Video Broadcasting (DVB); Measurement guidelines for DVB systems".

2.4 ANSI Standard

[18] ANSI T1.105-1991, *"Digital Hierarchy—Optical Interface Rates and Formats Specification"*, American National Standard for Telecommunications, 1991.

2.5 IETF Standard

[19] RFC 2615, *"PPP over SONET/SDH"* A. Malis, Internet Engineering Task Force, 1999.

3 Definitions

For the purposes of this Invention, the following definitions apply:

3.1 Aggregate Pipe: two symmetric counter fiber channels used to connect adjacent MSR nodes along the First and Second Working Ring. Aggregate pipe is a channel of STM-16/OC-48, STM-64/OC-192, contiguous concatenation of 16 VC4 or 48VC3 or 64 VC4 or 192 VC4, or virtual concatenation of a set of VC4 or VC3, 10Gigabit Ethernet. It is recommended that the same bandwidth of Aggregate Pipe in different span along the same ring is required. When SDH/SONET is applied to Aggregate Pipe, the overhead and other specifications of regeneration, multiplex section and high-order VC specified in ITU-T G.707 is used.

Note: 10GE Ethernet is SONET based WAN (Wide Area Network).

3.2 Control Signalling Packet: a packet used to Topology Discovery, Layer 2 Protection Switching of Manual Switch or Forced Switch etc in a node.

3.3 CT_Request Packet: a packet used to send a configuration table request from Node A to Node B.

3.4 CT_Response Packet: a packet used to send a configuration table response from Node B to Node A.

3.5 Configuration Table (CT): a mapping table reflecting the actual and using value of TT and TSN in a node and TCCR between nodes on the MSR ring during engineering operation.

3.6 Configuration Table Inquiry (CTI): a function to get CT from a node. CT_Request packet with a CTI parameter reflecting changing part of TCCR of a node on MSR ring is sent to other nodes (called one of them Node B) by unicasting/multicasting/broadcasting mode from a node (called Node A, e.g. Central station in the most case) by network management interface during normal engineering operation period. All nodes received CT_Request packet with a CTI parameter will give a point-to-point response by CT_Response packet with a CTI parameter reflecting actual configuration table of the local node on MSR ring to Node A.

3.7 Configuration Updating Table (CUT): a mapping table reflecting the available value modification of TT and TSN in a node and TCCR between nodes on the MSR ring during engineering operation. The CUT is applied during MSR engineering operation. The incorrect ICT will lead to fault of Tributary on MSR ring. CT_Request packet with an CUT parameter reflecting changed part of TCCR of all node on MSR ring is sent to other nodes by broadcasting mode from a node (e.g. Central station in the most case) by network management interface during normal engineering operation period. All nodes received CT_Request packet will build corresponding mapping relations of TCCR in the local node and give a point-to-point response by CT_Response packet to that node sending CT_Request packet. After getting CT-Response packet, that node sourcing CT_Request packet issues a CT_Confirm packet to that remote node sending CT_Response packet.

3.8 Forced Switch: operator does by network management or software debug facility, perform L2PS on the target span. Operational priority is higher than Manual Switching.

3.9 FWR-Fiber-Cut: a parameter of L2PS_Request Packet, used to stand for status indication of single fiber cut on FWR 3.10 Initial Configuration Table (ICT): a mapping table reflecting the initial and available value of TT and TSN in a node and TCCR between nodes on the MSR ring during engineering installation. The ICT must be pre-installed by (NVROM or FLASH RAM) before MSR engineering operation. The incorrect ICT will lead to fault of Tributary services on MSR ring. CT_Request packet with an ICT parameter reflecting initial TCCR of all nodes on MSR ring is sent to other nodes by broadcasting mode from a node (e.g. Central station in the most case) by network management interface during initial engineering operation period. All nodes received CT_Request packet will build corresponding mapping relations of TCCR in the local node and give a point-to-point response by CT_Response packet to that node sending CT_Request packet. After getting CT-Response packet, that node sourcing CT_Request packet issues a CT_Confirm packet to that remote node sending CT_Response packet.

3.11 L2 Protection Switching (L2PS): a powerful self-healing feature that allows to recovery from fiber facility or node failure within 50 ms. Analogous to the K1/K2 protocol mechanism that SONET/SDH ring does. L2PS entity in a node detects link status. If neither flag nor packet are received by a node in Rx direction within 20 ms (its value is programmable) in the FWR or SWR of aggregate pipe, or if fiber facility or a node is failure (e.g. PSD or PSF), two nodes on failure span will enter L2PS State.

3.12 Layer 3 Forwarding Packet: a packet used to forward data packet in a node. This packet is different from those packets of reaching all Tributary in a node, is also different from network management packets and control signalling packets. Logically, a node can be treated as a router of performing Layer 3 forwarding when a Layer 3 forwarding Packet is forwarded according to routing table and routing protocols of Ipv4/6 in a node from the node to other node along the MSR 3.13 L2PS_Request Packet: a packet used to send a Manual Switch or Forced Switch request from Node A to two adjacent nodes (Node B and C) of targeted span or to two adjacent nodes (Node B and C) of failure node.

3.14 L2PS State: If neither flag nor packet is received by a node within 20 ms (its value is programmable) in the FWR or SWR of aggregate pipe, or if fiber facility or a node is failure (e.g. PSD or PSF), two nodes on failure span will enter L2PS State. When a node enters L2PS State, forwarding means that received packet from a side of node will be forwarded to same side of this node (that is, received packet from westward on FWR will be forwarded to westward on SWR.). It does not look like a node in Normal State, forwarding means that received packet from westward on FWR will be forwarded to eastward on FWR.

3.15 Manual Switch: operator does by network management or software debug facility, perform L2PS on the target span.

3.16 Multiple Services Ring (MSR): a bi-directional symmetric counter-rotating fiber rings consisted of at least two nodes (refer to FIG. 4), each node could add and drop one or more independent Tributary. MSR supports multiple nodes transmit simultaneously and traffic engineering. A node can be inserted or removed online form the ring while other nodes and services will be operated normally without packet loss and service loss.

3.17 MSR Broadcast: a packet transmitted from a node can be sent to all other nodes along FWR or SWR by using MSR protocol.

3.18 MSR Filter Unit: a filtering and checking facility for packet NA and TTL. All packets reaching to the MSR filter Unit will be sent first to a buffer in the Node. The MSR node will check packet TTL and NA and perform XOR function with local NA. This packet will be taken away if TTL is zero. If its NA is match, those packets reaching destination will not be sent to neighbor (except for multicast and broadcast packets) along the same ring. Otherwise, those mismatched packet will go to neighbor directly by schedule unit without any processing after decrementing TTL field. This is MSR filtering function.

3.19 MSR Multicast: a packet transmitted from a node can be sent to several different nodes along First or Second Working Ring by using MSR protocol.

3.20 MSR Node: a system equipment that has an eastward Rx, eastward Tx, westward Rx and westward Tx Aggregate Pipe connections, and one or more adding and dropping independent Tributaries. It also has functions of receiving, transmitting and forwarding of network management packet, control signalling and data packet in a Node.

3.21 MSR Protocol (MSRP): a data link protocol between MAC/DVB/ATM (or PPP/Ipv4/Ipv6) frame (or packet) and the physical layer, used to communication between different nodes on the Multiple Services Ring. The MSR protocol does operate by sending both data packet and the associated network management/control packets in FWR, sending both data packet and the associated network management/control packets in SWR also. When SDH/SONET is applied to Aggregate Pipe, MSRP is octet oriented. For 10GE, MSRP is bit oriented.

3.22 MSRP Rx Processor: a set of functions used to MSRP protocol processing in Rx direction. It includes Rx Filter Unit, discrimination of multicasting/broadcasting and TT/TSN value and other associated MSRP protocol processing.

3.23 MSRP Tx Processor: a set of functions used to MSRP protocol processing in Tx direction. It includes Tx Schedule Unit, functions of determination of NA, TTL, TT, TSN, FCS, multicasting/broadcasting according to types and ports configuration of Tributary, a route of Layer 3 forwarding packet, requirement of control signalling or requirement of network management. The other associated MSRP protocol processing is also covered 3.24 MSR Schedule Unit: a control function for transmitted packet in a node according to the priority level of forwarded packets from upstream station, multicasting/broadcasting packets and transmitted packet from the local station. If there are several packets to be sent in a node at the same time, the schedule unit will decide which packet will go first to the downstream along the ring.

3.25 N_ct: a count of retransmission used to Configuration Table Operation. All nodes on a ring will wait to be assigned ICT during engineering installation period. After issuing CT_Request packet, Node A will automatically send CT_Request packet again after retransmit Timer_ct (it is programmable) if Node A does not receive corresponding CT_Response packet. It is believed that Node B is not reachable after N times of retransmission (N_ct is programmable also). N_ct is also used by CUT operation.

3.26 Network Management Packet: a packet used to performance and fault monitoring, node configuration management etc in a node.

3.27 Node Address (NA): an address of Node Link on the MSR ring. NA is a local address and has local meaning only along the MSR ring. It contains 4 octets. Each bit (binary "0" or "1") corresponds to a node. For example, the binary "00100000 00000000 00000000 00000000" stands for the $3^{rd}$ Node Address (station), the binary "00000100 00000000 00000000 00000000" stands for the $6^{th}$ Node Address (station) (refer to FIG. 4). You may also use binary "00000010 00000000 00000000 00000000" to stand for 7th Node Address of new insertion and the actual sequence location of the $7^{th}$ Node Address may be corresponded to middle position between Station 1 and Station 2 shown in FIG. 4 since the MSR supports online node insertion. All Node Address must be leftward alignment and be pre-installed by (NVROM) before operation. The maximum node number of the MSR Ring is 32. For implementation, people can use Ethernet MAC and Ipv4 address to perform external network management.

3.28 Normal State: a state used to describe a node that has normal Tx and Rx function on MSR ring and does not work on L2PS State. In Normal State, forwarding means that received packet from westward on FWR will be forwarded to eastward on FWR.

3.29 Physical Signal Degrade (PSD): random or automatic, caused by a physical signal degrade (e.g. excessive block or bit error rate). Once it happens, L2PS will be applied on the failure span.

3.30 Physical Signal Failure (PSF): random or automatic, caused by a physical signal failure (e.g. fiber facility failure). Once it happens, L2PS will be applied on the failure span.

3.31 Rate Adaptation: If the Rate Adaptation is needed in the MSRP transmit processing, transmit entity adds the rate-adaptation octet(s) "0xdd" within the frame by sending sequence(s) of {0x7d, 0xdd}. This function is performed just after transparency processing and before the end flag is added. In receive direction, receive entity will remove the Rate Adaptation octet(s) "0xdd" within the MSRP fame when detecting sequence(s) of {0x7d, 0xdd}, This function will be done just before transparency processing and after the end flag is detected.

3.32 Reference Point G1: a reference point between Rx Framer and RX Filter. It stands for termination of processing of MAC/GMAC physical layer before MII/GMII, or/and stands for termination of processing of SDH/SONET regeneration and multiplex section in receive direction. Please refer to FIG. 7-15.

3.33 Reference Point G2: a reference point between Tx Framer and TX Schedule. It stands for source of processing of MAC/GMAC physical layer before MII/GMII, or source of processing of SDH/SONET regeneration and multiplex section in receive direction. Please refer to FIG. 7-15.

3.34 Reference Point T1: a reference point between Tributary Rx Framer and MSRP processor. It stands for termination of processing of MSRP before encapsulation of physical tributary of MII/GMII/DVB/POS/ATM etc. Please refer to FIG. 3-12.

3.35 Reference Point T2: a reference point between Tributary Rx Framer and MSRP processor. It stands for source of processing of MSRP after stripping of physical tributary of MII/GMII/DVB/POS/ATM etc. Please refer to FIG. 7-15.

3.36 Rx Framer: an abstract of physical framer of Aggregate Pipe at Rx side, it stands for a framer of Gigabit Ethernet, 10G Ethernet, or physical layer framer of STM-1/OC-12, STM-16/OC-48, STM-64/OC-192 or STM-192/OC-768. If Aggregate Pipe is STM-16/OC-48 for example, the rate of signal channel at the Reference Point G1 (refer to FIG. 5) is VC-4-16c/VC-3-48c in the parallel way (just like POS PHY level 3 or SPI-3 defined by OIF) before Filter unit. If Aggregate Pipe is Gigabit Ethernet for example, the rate and signal are GMII at the Reference Point G1.

3.37 Second Working Ring (SWR): an outer or inner ring on the MSR. It can be defined as one of two symmetric counter-rotating rings. Default configuration of Second Working Ring is set to inner ring. It is programmable and is also set to the outer ring when the First Working Ring is set to the inner ring. In the case of fiber facility or node failure, Second Working Ring can be seen as bypass channel of First Working Ring.

3.38 SWR-Fiber-Cut: a parameter of L2PS_Request Packet, used to stand for status indication of single fiber cut on SWR.

3.39 Timer_ct: a Timer of retransmission used to Configuration Table Operation. All nodes on a ring will wait to be assigned ICT during engineering installation period. After issuing CT_Request packet, Node A will automatically send CT_Request packet again after retransmission Timer_ct (it is programmable) if Node A does not receive corresponding CT_Response packet. It is believed that Node B is not reachable after N times of retransmission (N_ct is programmable also). N_ct is also used by CUT operation.

3.40 Timer_WTR: a Timer used to prevent L2PS oscillation, the L2PS can waits Timer_WTR period (its value is programmable) before MSR enters Normal State.

3.41 Tributary: an independent adding/dropping tributary channel to/from the MSR nodes, just like a series "Private Line or Private Circuit for Renting from Carrier". Tributary can be an Ethernet, Gigabit Ethernet (defined in IEEE802.3), DVB (Digital Video Broadcasting, specified in [8]), other MSR (e.g. MSR of STM-16/OC48 into STM-64/OC-192 aggregate pipe), RPR (e.g. Resilient Packet Ring of STM-16/OC48 into STM-64/OC-192 aggregate pipe) and/or ATM port. The different tributary can be assigned to different priority. It is required that the bandwidth of Aggregate Pipe is higher than that of any Tributary.

3.42 Tributary Adaptation Function Unit: an adaptation function from/to various independent tributary type signals to/from reference point T1/T2. It has Tributary Adaptation Source Function and Tributary Adaptation Sink Function. Sink corresponds to reference point T1, source to reference point T2. This adaptation function can include the signal and rate transform, synchronous function between two sides.

3.43 Tributary Cross-connection Relationship (TCCR): a table reflecting Tributary cross-connection relationship of all nodes on MSR ring. It is global table of MSR, that is, source and sink relationship of all available Tributaries.

3.44 Tributary Rx Framer: an abstract of physical framer of Tributary at Rx side, it stands for a framer of Gigabit Ethernet, Ethernet (10/100 Mb/s), POS and ATM framer of STM-1/OC-12 and/or DVB framers. If Tributary is STM-1/OC-3 POS for example, the rate and signal at the Reference Point T1 (refer to FIG. 5) is POS PHY Level 1 or SPI-1 (defined by OIF) before Filter unit. If Tributary is Ethernet for example, the data at the Reference Point T1 is the payload of Ethernet MAC frame and interface is MII.

3.45 Tributary Tx Framer: an abstract of physical framer of Tributary at Tx side, it stands for a framer of Gigabit Ethernet, Ethernet (10/100 Mb/s), POS and ATM framer of STM-1/OC-12 and/or DVB framers. If Tributary is STM-1/OC-3 POS for example, the rate and signal at the Reference Point T2 (refer to FIG. 5) is POS PHY Level 1 or SPI-1 (defined by OIF) before Filter unit. If Tributary is Ethernet for example, the data at the Reference Point T2 is the payload of Ethernet MAC frame and interface is MII.

3.46 Tributary Sequence Number (TSN): a sequence number of same type of Tributary Port on a node. This number is 7 if the 7th Ethernet is provided in a node.

3.47 Tributary Type (TT): a type of an independent adding/dropping tributary channel to/from the MSR nodes. This type can be Ethernet, Gigabit Ethernet, DVB, RPR and ATM etc.

3.48 Topology Discovery: A data link control function in the MSRP, used to find out who is its neighbor and how many nodes is been working on the MSR (to ensure transmitted packet must be received by same station, destination address of packet is pointed to itself). Each station appends its NA as parameter to this Topology Discovery Packet by order, update the length of parameter and passes this packet to the neighbor along the MSR ring as shown in Table 6. It is not necessary to know what is mapping relationship between Node Address and the physical position along FWR and SWR. Each node performs topology discovery function periodically (The value of Timer is programmable) by sending topology discovery packet on the first or second working ring.

3.49 Time to Live: this 6 bit field is a hop-count that must decremented every time a node forwards a packet. The maximum number of nodes that are supported by MSR is 32. In the wrapped case, the total node space can be 64 nodes on a ring.

3.50 Tx Framer: an abstract of physical framer of Aggregate Pipe at Tx side, it stands for a framer of Gigabit Ethernet, 10G Ethernet, physical layer framer of STM-1/OC-12, STM-16/OC-48, STM-64/OC-192, STM-192/OC-768. If Aggregate Pipe is STM-16/OC-48 for example, the rate and signal at the Reference Point G2 (refer to FIG. 5) are VC4-16c/VC-3-48c in the parallel way (just like POS PHY level 3 or SPI-3 defined by OIF) before Filter unit. If Aggregate Pipe is Gigabit Ethernet for example, the rate and signal are GMII at the Reference Point G2.

3.51 Wait to Restore (WTR): random or automatic, activated after the node entered L2 protection switching meets the restoration criteria once the condition of the PSF, PSD or fiber facility failure disappears. To prevent L2PS oscillation, the L2PS can waits Timer_WTR period (its value is programmable) before MSR enters Normal State.

3.52 WTR_Request Packet: a packet used to transition to Normal State from L2PS State. After the node entered L2PS meets the restoration criteria once the condition of the PSF, PSD or fiber facility failure disappears. To prevent L2PS oscillation, the L2PS entity can waits Timer_WTR period (its value is programmable) to enter Normal State by using this packet.

3.53 Wrapped packet: The transmitted packet sourced from upstream reaches a MSR node and is sent to downstream along the same ring in the normal case. However in the wrapped case, transmitted packet is sent to the upstream neighbor on the opposite MSR ring.

4 Abbreviations 4.1 Abbreviations Specified in IEEE 802.3

This Invention makes use of the following abbreviations specified in IEEE 802.3:
 a) LAN Local area network
 b) MAC Media access control.
 c) MII Media Independent Interface.
 c) GE Gigabit Ethernet 4.2 Abbreviations Specified in ITU-T Recommendation G.707

This Invention makes use of the following abbreviations specified in ITU-T Recommendation G.707:
 a) SDH Synchronous Digital Hierarchy
 b) STM Synchronous Transfer Module
 c) VC Virtual Container.

4.3 Abbreviations Specified in ITU-T I.321 and I.361

This Invention makes use of the following abbreviations specified in ITU-T Recommendation:
 a) ATM Asynchronous Transfer Mode 4.4 Abbreviations Specified in ETSI This Invention makes use of the following abbreviations specified in ETSI Recommendation EN 300 429:
 a) DVB Digital Video Broadcasting 4.5 Abbreviations Specified in IETF This Invention makes use of the following abbreviations specified in IETF RFC2615 and RFC 2892:
 a) PPP Point-to-point Protocol
 b) POS Packet Over SONET/SDH
 c) RPR Resilient Packet Ring 4.6 Abbreviations Specified in ANSI This Invention makes use of the following abbreviations specified in ANSI T1.105-1991:
 a) SONET Synchronous Optical Network 4.7 Abbreviations Specified in this Invention
 a) FWR First Working Ring
 b) CS&NM Control Signalling and Network Management
 c) CTI Configuration Table Inquiry
 d) CUT Configuration Updating Table
 e) ICT Initial Configuration Table
 f) L2PS Layer 2 Protection Switch
 g) MSR Multiple Services Ring
 h) MSRP Multiple Services Ring Protocol
 i) PSD Physical Signal Degrade
 j) PSF Physical Signal Failure
 k) NA Node Address
 l) Rx Receive data
 m) SWR Second Working Ring
 n) TCCR Tributary Cross-Connection Relationship
 o) TSN Tributary Sequence Number
 p) TT Tributary Type
 q) Tx Transmission data
 r) WTR Wait to Restore 5 MSR Network Framework 5.1 Elements of Ring MSR is a bi-directional symmetric counter-rotating fiber rings consisted of at least two nodes (refer to FIG. 4), each node could add and drop one or more independent Tributary (e.g. Ethernet, Gigabit Ethernet, DVB, POS and/or ATM port, also could transmit and receive Layer 3 (Ipv4/Ipv6 packet) forwarding data packet Oust like router), Control Signalling Packet and Network Management Packet. MSR supports multicast and broadcast of these Tributary service and forwarding data packet. Aggregate pipe can be any kind of STM-4/OC-12, STM-16/OC-48, STM-64/OC-192, Gigabit Ethernet and 10Gigabit Ethernet. A node can be inserted or removed online from the ring while other nodes and services will be operated normally without packet loss and service loss.

5.2 Packet Types on a Ring and Multiple Service in Tributary

Each node has ability of adding and dropping one or more independent Tributary services defined in Table 1.

TABLE 1

X.msr - Types of multi-service in Tributary

| Tributary types | CAPABILITIES | | |
|---|---|---|---|
| Ethernet (specified in IEEE802.3) | Full duplex point-to-point | Multicasting | Broadcasting |
| GE (specified in IEEE802.3) | Full duplex point-to-point | Multicasting | Broadcasting |
| DVB (specified in ETSI EN 300 429) | Half duplex point-to-point | Multicasting | Broadcasting |
| STM-1/OC-3c ATM | Full duplex point-to-point | Multicasting | Broadcasting |
| STM-4c/OC-12c ATM | Full duplex point-to-point | Multicasting | Broadcasting |
| STM-1/OC-3c POS | Full duplex point-to-point | Multicasting | Broadcasting |
| STM-4c/OC-12c POS | Full duplex point-to-point | Multicasting | Broadcasting |

TABLE 1-continued

X.msr - Types of multi-service in Tributary

| Tributary types | CAPABILITIES |
|---|---|
| MSR | Full duplex point-to-point |
| RPR | Full duplex point-to-point |

Note 1:
It is required that the bandwidth of Aggregate Pipe is higher than that of any Tributary.
Note 2:
Multicasting is half duplex point-to-multipoint, Broadcasting is half duplex point to all other points on a ring.
Note 3:
The mechanism of Ethernet/GE over SDH/SONET transport along MSR ring is almost the same as that of ITU-T Recommendation X.86/Y.1323 when LAPS is replaced by MSRP in the protocol stack.

Transmitted and received packets on a ring have four types: packets of multi-service to Tributary, Layer 3 (Ipv4/Ipv6 packet) forwarding data packet (just like router), Control Signalling Packet and Network Management Packet specified in Table 2. They have full capabilities of point-to-point, multicasting and broadcasting along a ring.

TABLE 2

X.msr - Packet types

| Packet types | CAPABILITIES | | |
|---|---|---|---|
| Packets of multi-service to Tributary | Point-to-point | Multicasting | Broadcasting |
| Layer 3 (Ipv4/Ipv6 packet) forwarding data packet (a node operates just like a router) | Point-to-point | Multicasting | Broadcasting |
| Control Signalling Packet | Point-to-point | Multicasting | Broadcasting |
| Network Management Packet | Point-to-point | Multicasting | Broadcasting |

5.3 Components of Node

A MSR node is a system equipment that has an eastward Rx, eastward Tx, westward Rx and westward Tx Aggregate Pipe connections, and one or more adding and dropping independent Tributaries. A MSR node also has functions of receiving, transmitting and forwarding of network management packet, control signalling and data packet in a Node. The basic components of a MSR node are as follows:

5.3.1 Aggregate Pipe: two symmetric counter fiber channels used to connect adjacent MSR nodes along the First and Second Working Ring. Aggregate pipe is a channel of STM-16/OC48, STM-64/OC-192, contiguous concatenation of 16 VC4 or 48VC3 or 64 VC4 or 192 VC4, or virtual concatenation of a set of VC4 or VC3, 10Gigabit Ethernet. It is recommended that the same bandwidth of Aggregate Pipe in different span along the same ring is required. When SDH/SONET is applied to Aggregate Pipe, the overhead and other specifications of regeneration, multiplex section and high-order VC specified in ITU-T G.707 is used.

5.3.2 Tributary: an independent adding/dropping tributary channel to/from the MSR nodes, just like a series "Private Line or Private Circuit for Renting from Carrier". Tributary can be an Ethernet, Gigabit Ethernet (defined in IEEE802.3), DVB (Digital Video Broadcasting, specified in [8]) other MSR, RPR and/or ATM port. The different tributary can be assigned to different priority.

5.3.3 First Working Ring (FWR): an outer or inner ring on the MSR. It can be defined as one of two symmetric counter-rotating rings. Default configuration of FWR is set to outer ring. It is programmable and can be changed to the inner ring.

5.3.4 Second Working Ring (SWR): an outer or inner ring on the MSR. It can be defined as one of two symmetric counter-rotating rings. Default configuration of SWR is set to inner ring. It is programmable and is also set to the outer ring when the FWR is set to the inner ring. In the case of fiber facility or node failure, SWR can be seen as bypass channel of First Working Ring. But in normal case, it is working channel also.

5.3.5 MSR filter Unit: a filtering and checking facility for packet NA and TTL. All packets reaching to the MSR filter Unit will be sent first to a buffer in the Node. The MSR node will check packet TTL and NA and perform XOR function with local NA. This packet will be taken away if TTL is zero. If its NA is match, those packets reaching destination will not be sent to neighbor (except for multicast and broadcast packets) along the same ring. Otherwise, those mismatched packet will go to neighbor directly by schedule unit without any processing after decrementing TTL field. This is MSR filtering function.

5.3.6 MSR Schedule Unit: a control function for transmitted packet in a node according to the priority level of forwarded packets from upstream station, multicasting/broadcasting packets and transmitted packet from the local station. If there are several packets to be sent in a node at the same time, the schedule unit will decide which packet will go first to the downstream along the ring.

5.3.7 Rx Framer: an abstract of physical framer of Aggregate Pipe at Rx side, it stands for a framer of Gigabit Ethernet, 10G Ethernet, or physical layer framer of STM-1/OC-12, STM-16/OC-48, STM-64/OC-192 or STM-192/OC-768. If Aggregate Pipe is STM-16/OC-48 for example, the rate of signal channel at the Reference Point G1 (refer to FIG. 5) is VC4-16c/VC-348c in the parallel way (just like POS PHY level 3 or SPI-3 defined by OIF) before Filter unit. If Aggregate Pipe is Gigabit Ethernet for example, the rate and signal are GMII at the Reference Point G1.

5.3.8 Tx Framer: an abstract of physical framer of Aggregate Pipe at Tx side, it stands for a framer of Gigabit Ethernet, 10G Ethernet, physical layer framer of STM-1/OC-12, STM-16/OC-48, STM-64/OC-192, STM-192/OC-768. If Aggregate Pipe is STM-16/OC-48 for example, the rate and signal at the Reference Point G2 (refer to FIG. 5) are VC-4-16c/VC-3-48c in the parallel way (just like POS PHY level 3 or SPI-3 defined by OIF) before Filter unit. If Aggregate Pipe is Gigabit Ethernet for example, the rate and signal are GMII at the Reference Point G2.

5.3.9 Tributary Rx Framer: an abstract of physical framer of Tributary at Rx side, it stands for a framer of Gigabit Ethernet, Ethernet (10/100 Mb/s), POS and ATM framer of STM-1/OC-3, STM-4/OC-12 and/or DVB framers. If Tributary is STM-1/OC-3 POS for example, the rate and signal at the Reference Point T1 (refer to FIG. 5) is POS PHY Level 1 or SPI-1 (defined by OIF) before Filter unit. If Tributary is Ethernet for example, the data at the Reference Point T1 is the payload of Ethernet MAC frame and interface is MII.

5.3.10 Tributary Tx Framer: an abstract of physical framer of Tributary at Tx side, it stands for a framer of Gigabit Ethernet, Ethernet (10/100 Mb/s), POS and ATM framer of STM-1/OC-3, STM-4/OC-12, other MSR, RPR and/or DVB framers. If Tributary is STM-1/OC-3 POS for example, the rate and signal at the Reference Point T2 (refer to FIG. 5) is POS PHY Level 1 or SPI-1 (defined by OIF) before Filter unit. If Tributary is Ethernet for example, the data at the Reference Point T2 is the payload of Ethernet MAC frame and interface is MII.

5.4 Reference Point in Node

The four different Reference Points are defined in a node.

5.4.1 Reference Point G1: a reference point between Rx Framer and RX Filter. It stands for termination of processing of MAC/GMAC physical layer before MII/GMII, or/and stands for termination of processing of SDH/SONET regeneration and multiplex section in receive direction. Please refer to FIG. 7-15.

5.4.2 Reference Point G2: a reference point between Tx Framer and TX Schedule. It stands for source of processing of MAC/GMAC physical layer before MII/GMII, or source of processing of SDH/SONET regeneration and multiplex section in receive direction. Please refer to FIG. 7-15.

5.4.3 Reference Point T1: a reference point between Tributary Rx Framer and MSRP Rx processor. It stands for termination of processing of MSRP before encapsulation of physical tributary of MII/GMII/DVB/POS/ATM etc. Please refer to FIG. 7-15.

5.4.4 Reference Point T2: a reference point between Tributary Rx Framer and MSRP Tx processor. It stands for source of processing of MSRP after stripping of physical tributary of MII/GMII/DVB/POS/ATM etc. Please refer to FIG. 7-15.

5.5 Data Flow of Tx and Rx to Tributary 5.5.1 Rx direction: Rx packets entering a node at the Reference Point G1 are sent to Rx Filter Unit after performing Rx framer. Rx Filter Unit will check and filter TTL, FCS and NA of packet. All packets reaching to the MSR Filter Unit will be sent first to a buffer in the Node. The MSR Filter Unit will check TTL, FCS and NA of packet and perform XOR function with local NA. This packet will be taken away and discarded if TTL is zero or FCS is error.

If its NA is match, those packets reaching destination will not be sent to neighbor along the same ring (e.g. FWR). Otherwise, those mismatched packet will go to neighbor directly by schedule unit without any processing after decrementing TTL field.

If the received packet is multicasting or broadcasting packets, it will be sent first to Tx Schedule Unit to downstream node after decrementing TTL field, and it is coped to other buffer for further related processing in the local node at the same time.

After checked the aspects of TTL, NA and multicasting/broadcasting, a packet to reach destination is operated second procedure in the local node (station). That is, are TT and TSN illegal? If yes, this packet will be discarded. If no, this will be transferred to the corresponding Tributary port, Layer 3 forwarding unit, control signalling unit or network management unit at the Reference Point T1 according its value of TT and TSN.

5.5.2 Tx direction: Rx packets entering a MSRP Tx processor from a Tributary port, Layer 3 forwarding unit, control signalling unit or network management unit at the Reference Point T2, will be got TTL, TCS, TT, TSN values and multicasting/broadcasting requirement first, and then got NA value according to types and ports configuration of Tributary, a route of Layer 3 forwarding packet, requirement of control signalling or requirement of network management. After that, these packets will be sent to TX Schedule Unit. There are three types input: multicasting/broadcasting packets from upstream from other node, point-to-point packet for transferring from upstream and transmitted packet from local station. They are all went into TX Schedule Unit. Schedule Unit will operate a control function for these transmitted packets in a node according to the priority level of these packets. If there are several packets to be sent in a node at the same time, the schedule unit will decide which packet will go first to the downstream along the ring. It is also possible to discard those packets of lower priority level during burst Tx period.

5.6 Operation of Layer 3 Forwarding Packets

MSR node can be used as a router to forward route packets to other node on MSR ring according to relationship between Ipv4/Ipv6 routing table and its NA/TT/TSN while this node could provide Tributary port for renting just like private line or circuit. When MSR node is taken a role of router, the control plan (e.g. operation of routing protocols), network management plan (e.g. Simple Network Management Protocol) and traffic plan of said router (MSR node) will share the same logical channel corresponding to the value of NA, TT and TSN along the ring. That is, the control signalling packets of said router (MSR node) will be operated on the different channel from the control signalling packets of MSR ring.

5.7 Operation of Control Signalling Packets 5.7.1 Operation of Topology Discovery Packet 5.7.1.1 Operation of Topology Discovery Packet in Normal State Topology Discovery Packet is a control packet in the MSRP, used to figure out who is its neighbor and how many nodes are been working on the MSR (to ensure transmitted packet must be received by same station sending Topology Discovery Packet, destination address of packet is pointed to itself). Periodically (Timer_topology_discovery defaults to 3 seconds and is programmable), each station (e.g. Node A) broadcasts Topology_Discovery Request Packet with a Null parameter along a FWR and SWR respectively. All stations (e.g. Node B) received Topology_Discovery_Request Packet give a response by Topology_Discovery_Response Packet with a local NA (e.g. NA of Node B) to that station (e.g. Node A). Node A appends received NA and TTL value to its Topology Address Library in Node A by order of stations after getting Topology_Discover_Response packet. The order of stations along a ring is dependent on difference of TTL value. TTL value, state (Normal State or L2PS State) of Node B, Ring state (Normal State or L2PS State) and value of FWR/SWR are bound to NA of Node B together as a record of Topology Address Library in Node A. The maximum and minimum values of TTL in a record of FWR or SWR correspond to two neighbors of Node A. The records of Topology Address Library of FWR and SWR are operated separately.

If FWR The operation of topology discovery packet is valid and topology status in a node is refreshed if the same results are got after consecutive 3 times transmission of topology discovery packet. Otherwise, the previous record of topology status will be kept unchanged. The operation and record of FWR and SWR topology discovery in a node are carried out separately.

5.7.1.2 Operation of Topology Discovery Packet in the Case of FWR Fiber Cut

The MSR protocol does work by sending both data packet and the associated network management/control packets in FWR, sending both data packet and the associated network management/control packets in SWR also.

Figure 4:
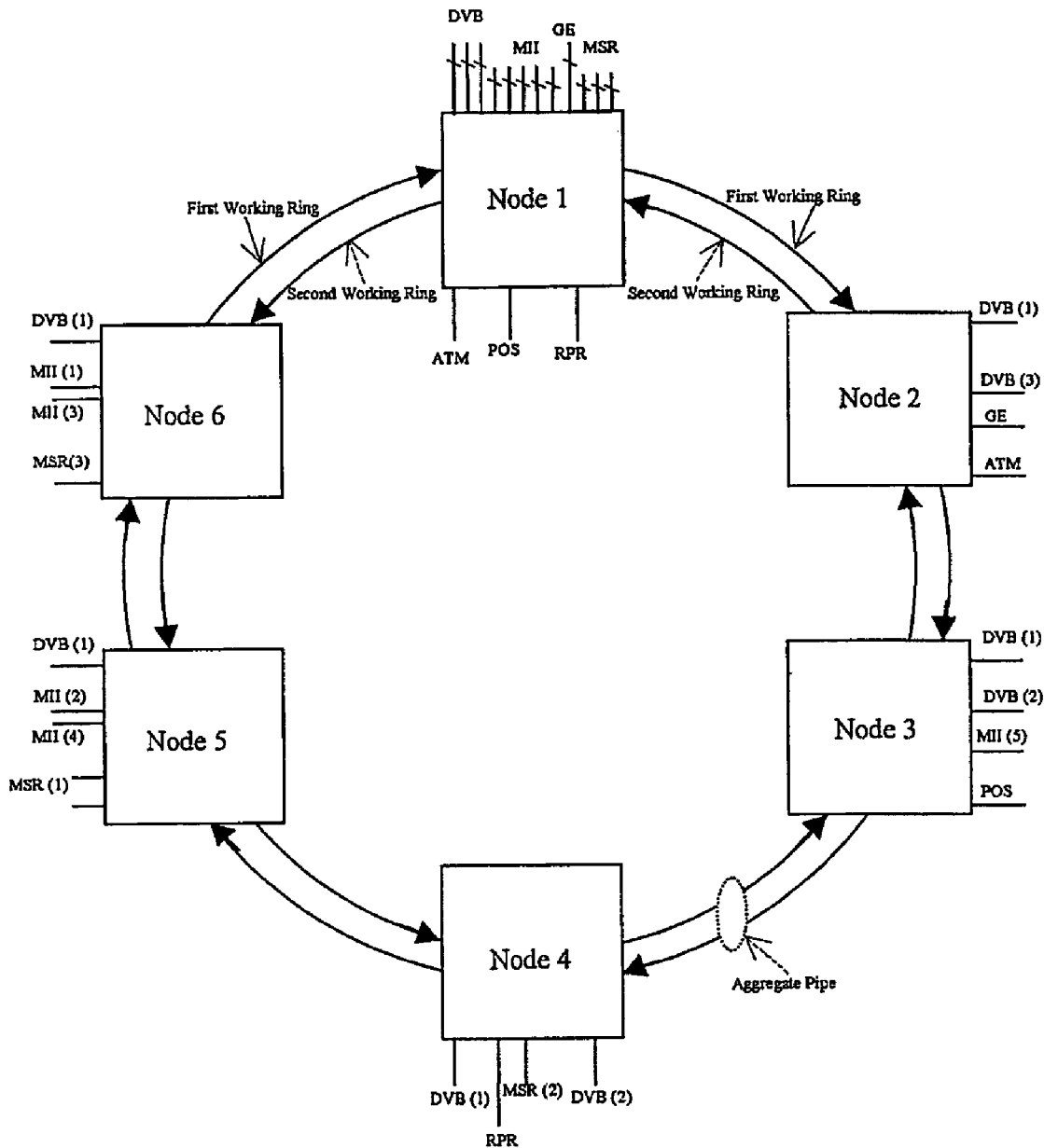
FIG. 4 illustrates the Topology of Multiple Services Ring.
Figure 5:
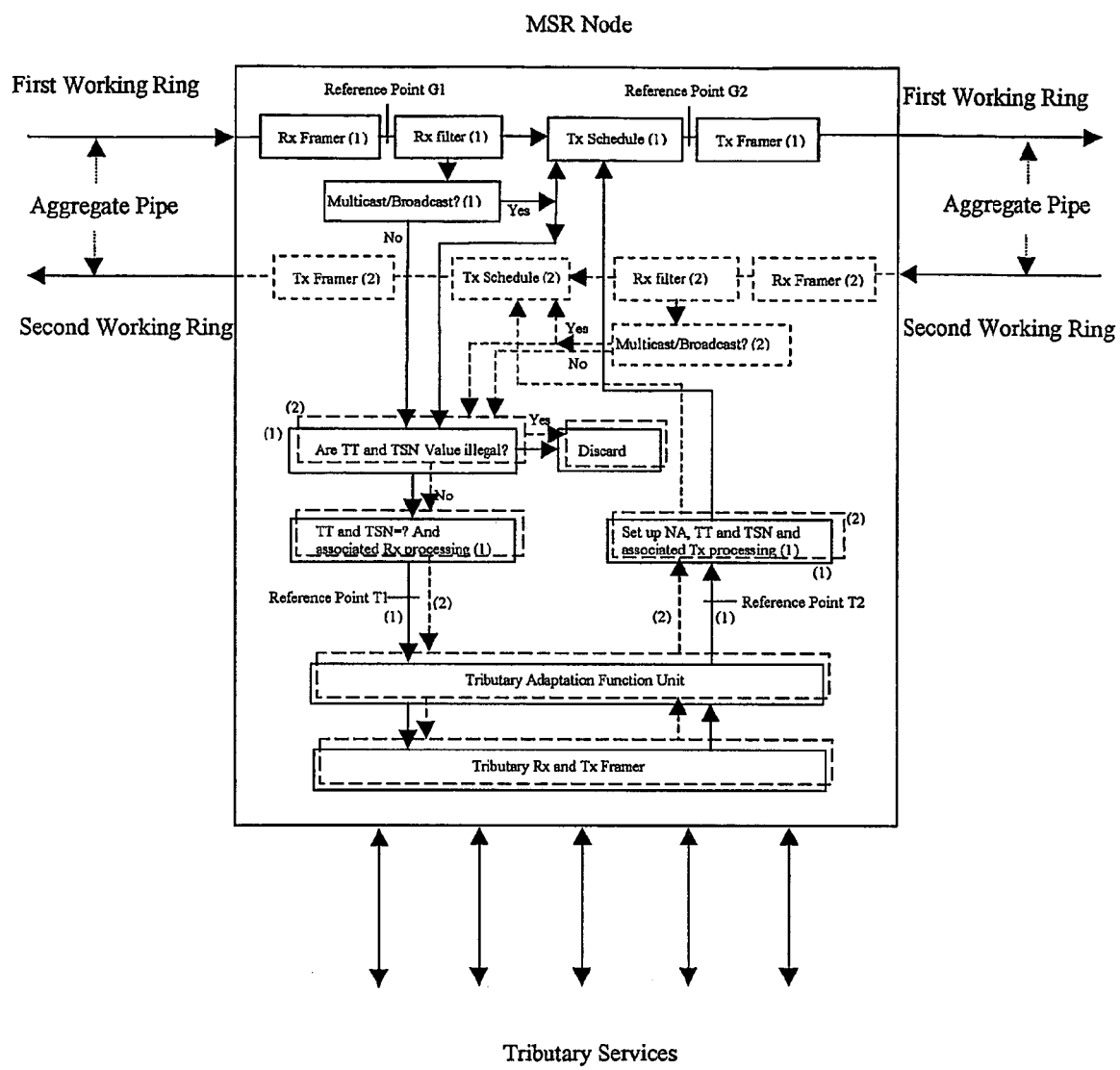
FIG. 5 illustrates Tx and Rx Diagram of MSR Node.

If single fiber is cut or PSF occurs on FWR from Node 1 to Node 2 in FIG. 4 for example, Node 2 detects PSF on FWR. Node 1 and Node 2 enter L2PS state from Node 1 to Node 2 on FWR and an L2PS_Event_Report Packet is broadcasted to all stations in a ring. At this moment, data packet and the corresponding network management/control packets in SWR, Node 3, 4, 5 and 6 are kept in normal state as usually. Periodically (Timer_topology discovery defaults to 3 seconds and is programmable), any station of Node 1, 2, 3, 4, 5 and 6 (e.g. Node C) broadcasts Topology_Discovery_Request Packet with a Null parameter along a FWR first. When and if it reaches Node 1 or Node 2, or transmitted from Node 1 to Node 2, the route of this Topology_Discovery_Request Packet will be changed to FWR in the opposite direction. If FWR is involved in L2PS state, TTL value of those nodes sending packet and not being in L2PS state on SWR should be double of that in normal state when a packet is sent from these nodes. All stations (e.g. Node D) received Topology_Discovery_Request Packet give a response by Topology_Discovery_Response Packet with a local NA (e.g. NA of Node D) to that station (e.g. Node C). Node C appends received NA and TTL value to its Topology Address Library in Node C by order of stations. The order of stations along a ring is dependent on difference of TTL value. TTL value, state (Normal State or L2PS State) of Node D, state of ring (Normal State or L2PS State) and value of FWR/SWR are bound to NA of Node D together as a record of Topology Address Library in Node C. The maximum and minimum values of TTL in a record of FWR or SWR correspond to two neighbors of Node C. The records of Topology Address Library of SWR and FWR are operated separately.

5.7.1.3 Operation of Topology Discovery Packet in the Case of SWR Fiber Cut

If single fiber is cut or PSF occurs on SWR from Node 2 to Node 1 in FIG. 4 for example, Node 1 detects PSF on SWR, Node 2 and Node 1 enter L2PS state from Node 2 to Node 1 on SWR and an L2PS_Event_Report Packet is broadcasted to all stations in a ring. At this moment, data packet and the corresponding network management/control packets in SWR, Node 3, 4, 5 and 6 are kept in normal state as usually. Periodically (Timer_topology_discovery defaults to 3 seconds and is programmable), any station of Node 1, 2, 3, 4, 5 and 6 (e.g. Node C) broadcasts Topology_Discovery_Request Packet with a Null parameter along a SWR first. When and if it reaches Node 2 or Node 1, or transmitted from Node 2 to Node 1, the route of this Topology_Discovery_Request Packet will be changed to FWR in the opposite direction. If SWR is involved in L2PS state, TTL value of those nodes sending packet and not being in L2PS state on SWR should be double of that in normal state when a packet is sent from these nodes. All stations (e.g. Node D) received Topology_Discovery_Request Packet give a response by Topology_Discovery_Response Packet with a local NA (e.g. NA of Node D) to that station (e.g. Node C). Node C appends received NA and TTL value to its Topology Address Library in Node C by order of stations. The order of stations along a ring is dependent on difference of TTL value. TTL value, state (Normal State or L2PS State) of Node D, state of ring (Normal State or L2PS State) and value of FWR/SWR are bound to NA of Node D together as a record of Topology Address Library in Node C. The maximum and minimum values of TTL in a record of FWR or SWR correspond to two neighbors of Node C. The records of Topology Address Library of SWR and FWR are operated separately.

5.7.1.4 Operation of Topology Discovery Packet in the Case of Bidirectional Fiber Cut If bidirectional fiber are cut or PSF occurs on both FWR and SWR from Node 1 to Node 2 in FIG. 4 for example, Node 1 and Node 2 detect PSF on SWR and FWR respectively. Node 1 and Node 2 enter L2PS state from Node 1 to Node 2 on FWR and from Node 2 to Node 1 on SWR, and an L2PS_Event_Report Packet is broadcasted to all stations in a ring. At this moment, Node 3, 4, 5 and 6 are kept in normal state as usually. Periodically (Timer_topology_discovery defaults to 3 seconds and is programmable), any station of Node 1, 2, 3, 4, 5 and 6 (e.g. Node C) broadcasts Topology_Discovery_Request Packet with a Null parameter along both FWR and SWR. When and if it reaches Node 1 or Node 2, or transmitted from Node 1 to Node 2, the route of this Topology_Discovery Request Packet will be changed from FWR to SWR or from SWR to FWR in the opposite direction. If both FWR and SWR are involved in L2PS state, TTL value of those nodes sending packet and not being in L2PS state on both FWR and SWR should be double of that in normal state when a packet is sent from these nodes. All stations (e.g. Node D) received Topology_Discovery_Request Packet give a response by Topology_Discovery_Response Packet with a local NA (e.g. NA of Node D) to that station (e.g. Node C). Node C appends received NA and TTL value to its Topology Address Library in Node C by order of stations. The order of stations along a ring is dependent on difference of TTL value. TTL value, state (Normal State or L2PS State) of Node D, state of ring (Normal State or L2PS State) and value of FWR/SWR are bound to NA of Node D together as a record of Topology Address Library in Node C. The maximum and minimum values of TTL in a record of FWR or SWR correspond to two neighbors of Node C. The records of Topology Address Library of SWR and FWR are operated separately.

5.7.1.5 Operation of Topology Discovery Packet in the Case of Bidirectional Failure on Both Sides of Node If bidirectional Failure on Both Sides of Node 2 for example, Node 1 and Node 3 detect PSF on SWR and FWR respectively. Node 1 and Node 3 enter L2PS state from Node 1 to Node 3 on FWR and from Node 3 to Node 1 on SWR, and an L2PS_Event_Report Packet is broadcasted to all stations in a ring. At this moment, Node 4, 5 and 6 are kept in normal state as usually. Periodically (Timer_topology discovery defaults to 3 seconds and is programmable), any station of Node 1, 3, 4, 5 and 6 (e.g. Node C) broadcasts Topology_Discovery_Request Packet with a Null parameter along both FWR and SWR. When and if it reaches Node 1 or Node 3, or transmitted from Node 1 to Node 3, the route of this Topology_Discovery_Request Packet will be changed from FWR to SWR or from SWR to FWR in the opposite direction. If both FWR and SWR are involved in L2PS state, TTL value of those nodes sending packet and not being in L2PS state on both FWR and SWR should be double of that in normal state when a packet is sent from these nodes. All stations (e.g. Node D) received Topology_Discovery_Request Packet give a response by Topology_Discovery_Response Packet with a local NA (e.g. NA of Node D) to that station (e.g. Node C). Node C appends received NA and TTL value to its Topology Address Library in Node C by order of stations. The order of stations along a ring is dependent on difference of TTL value. TTL value, state (Normal State or L2PS State) of Node D, state of ring (Normal State or L2PS State) and value of FWR/SWR are bound to NA of Node D together as a record of Topology Address Library in Node C. The maximum and minimum values of TTL in a record of FWR or SWR correspond to two neighbors of Node C. The records of Topology Address Library of SWR and FWR are operated separately.

5.7.2 Operation of Manual Switch and Forced Switch Packets

L2PS_Request packet with a Manual_Switch or Forced_Switch parameter targeting one or two spans on MSR ring is sent to other nodes by unicasting or multicasting mode from a node (called Node A, e.g. Central station in the most case) by network management interface during initial engineering operation period. All nodes (called Node B) received L2PS_Request packet will perform corresponding switching operation in the adjacent nodes (Node B and C) of targeted span and give a point-to-point response by L2PS_Response packet with a parameter of Successful_Switch or Unsuccessful_Switch to Node A, and issues L2PS_Event_Report packet with a set parameters of Forced_Switch/Manual_Switch and L2PS-State to designated node (connected to Network management) and/or broadcasts to all stations in normal state in a ring. It is successful operation if Node A receives two correct responses from both Node B and Node C. Otherwise, it is not successful operation.

5.7.3 Operation of L2PS in the Case of PSF/PSD and Node Failure

5.7.3.1 Operation of FWR Fiber Cut

If single fiber is cut or PSF occurs on FWR from Node 1 to Node 2 in FIG. 4 for example, Node 2 detects PSF on FWR. That is, neither flag nor packet is received within 30 ms (the values of T200 and N200 are programmable) in the FWR of short path. L2PS entity in a Node 2 will start L2PS function and perform following sub-functions:

(1) Node 2 goes into L2PS State and passes L2PS_Request Packet with a parameter of FWR_Fiber_Cut along short path of SWR to Node 1. After getting this packet, Node 1 enters L2PS State also, and issues L2PS_Event_Report packet with a set parameters of SWR_Fiber_Cut/FWR_Fiber_Cut, PSF/PSD and L2PS-State to designated node (connected to Network management) and/or broadcasts to all stations in normal state in a ring. In L2PS State, all packets from Node 1 to Node 2 along short path of FWR are switched to the longest path of SWR in opposite direction.

(2) When PSF on Node 2 clears, Node 2 goes to Normal State, starts Timer_WTR (it is programmable). Once Timer_WTR expires, Node 2 sends WTR-Request Packet with a parameter of Successful_WTR to Node 1 along both short path and the longest path at once. Node 1 goes back to Normal State from L2PS State after receiving this packet.

5.7.3.2 Operation of SWR Fiber Cut

If single fiber is cut or PSF occurs on SWR from Node 2 to Node 1 in FIG. 4 for example, Node 1 detects PSF on SWR. That is, neither flag nor packet is received within 20 ms (its value is programmable) in the SWR of short path. L2PS entity in a Node 1 will start L2PS function and perform following sub-functions:

(1) Node 1 goes into L2PS State and passes L2PS_Request Packet with a parameter of SWR-Fiber-Cut along short path of FWR to Node 2. After getting this packet, Node 2 enters L2PS State also, and issues L2PS_Event_Report packet with a set parameters of SWR_Fiber_Cut/FWR_Fiber_Cut, PSF/PSD and L2PS-State to designated node (connected to Network management) and/or broadcasts to all stations in normal state in a ring. In L2PS State, all packets from Node 2 to Node 1 along short path of FWR are switched to the longest path of SWR in opposite direction.

(2) When PSF on Node 1 clears, Node 1 goes to Normal State, starts Timer_WTR (it is programmable). Once Timer_WTR expires, Node 1 sends WTR-Request Packet with a parameter of Successful_WTR to Node 2 along both short path of SWR and the longest path of FWR at once. Node 2 goes back to Normal State from L2PS State after receiving this packet.

5.7.3.3 Operation of Bidirectional Fiber Cut

If bidirectional fiber is cut or PSF occurs on both FWR and SWR from Node 1 to Node 2 in FIG. 4 for example, Node 1/Node 2 detects PSF on SWR/FWR. That is, neither flag nor packet is received within 20 ms (its value is programmable) in both FWR and SWR of short path. L2PS entity in both Node 1 and Node 2 will start L2PS function and perform following sub-functions:

(1) Node 1/Node 2 goes into L2PS State itself and passes L2PS_Request Packet with a parameter of SWR_Fiber_Cut/FWR_Fiber_Cut along the longest path of FWR/SWR to Node 2/Node 1. After getting this packet, both Node 2 and Node 1 enters L2PS State, and issues L2PS_Event_Report packet with a set parameters of SWR_Fiber_Cut/FWR_Fiber_Cut, PSF/PSD and L2PS-State to designated node (connected to Network management) and/or broadcasts to all stations in normal state in a ring. In L2PS State, all packets from Node 1 to Node 2 or from Node 2 to Node 1 along short path of FWR/SWR are switched to the longest path of SWR/FWR in opposite direction.

(2) When PSF on Node 1 and Node 2 clears, Node 1 and Node 2 go to Normal State, starts Timer_WTR (it is programmable). Once Timer_WTR expires, Node 1/Node 2 sends WTR_Request Packet with a parameter of Successful_WTR to Node 2/Node 1 along the longest path at once. Node 1/Node 2 goes back to Normal State from L2PS State after receiving this packet.

5.7.3.4 Operation of Bidirectional Failure on Both Sides of Node

Bidirectional Failure on Both Sides of Node is complete node failure. If it is Node 2 in FIG. 4 for example, Node 1 and Node 3 detect PSF on both SWR and FWR. That is, neither flag nor packet is received within 20 ms (its value is programmable) in both FWR and SWR of shorter path via Node 2. L2PS entity in both Node 1 and Node 3 will start L2PS function and perform following sub-functions:

(1) Node 1/Node 3 goes into L2PS State itself in both directions and passes L2PS_Request Packet with a parameter of SWR_Fiber_Cut/FWR_Fiber_Cut along the longer path of FWR/SWR to Node 3/Node 1. After getting this packet, both Node 3 and Node 1 enters L2PS State in both directions, and issues L2PS_Event_Report packet with a set parameters of SWR_Fiber_Cut/FWR_Fiber_Cut, PSF/PSD and L2PS-State to designated node (connected to Network management) and/or broadcasts to all stations in normal state in a ring. In L2PS State of both directions, all packets from Node 1 to Node 3 or from Node 3 to Node 1 along shorter path of FWR/SWR are switched to the longer path of SWR/FWR in opposite direction.

(2) When PSF on Node 1 and Node 3 clears or Node 2 is restored, Node 1 and Node 3 go to Normal State, starts Timer_WTR (it is programmable). Once Timer_WTR expires, Node 1/Node 3 sends WTR-Request Packet with a parameter of Successful_WTR to Node 3/Node 1 along the longer path at once. Node 1/Node 3 goes back to Normal State from L2PS State after receiving this packet.

5.7.3.5 Operation of Bidirectional Failure on One Side of Node

This case is the same as 5.7.3.3.

5.8 Operation of Network Management Packets 5.8.1 Initial Configuration Table (ICT) Operation ICT is a mapping table reflecting the initial and available value of TT and TSN in a node and TCCR between nodes on the MSR ring during engineering installation. The ICT must be pre-installed by (NVROM or FLASH RAM) before MSR engineering operation. The incorrect ICT will lead to fault of Tributary services on MSR ring. CT_Request packet with an ICT parameter reflecting initial TCCR of all nodes on MSR ring is sent to other nodes by broadcasting mode from a node (called Node A, e.g. Central station in the most case) by network management interface during initial engineering operation period. All nodes (called Node B) received CT_Request packet will build corresponding mapping relations of TCCR in the local node and give a point-to-point response by CT_Response packet to Node A.

All nodes on a ring will wait to be assigned ICT during engineering installation period. After issuing CT_Request packet, Node A will automatically send CT_Request packet again after retransmit timer (it is programmable, named for Timer_ct) if Node A does not receive corresponding CT_Response packet. It is believed that Node B is not reachable after N times of retransmission (N_ct is programmable also).

If Node A has received a message of CT_Response packet with a Null parameter from Node B either before CT retransmit expired or before N times of retransmission, it is believed that ICT operation for Node B is successful.

5.8.2 Configuration Updating Table (CUT) Operation

CUT is a mapping table reflecting the available value modification of TT and TSN in a node and TCCR between nodes on the MSR ring during the engineering operation. The CUT is applied during MSR engineering operation. The incorrect ICT will lead to fault of Tributary on MSR ring. CT_Request packet with a CUT parameter reflecting changed part of TCCR of all nodes on MSR ring is sent to other nodes (called one of them Node B) by broadcasting mode from a node (called Node A, e.g. Central station in the most case) by network management interface during normal engineering operation period. All nodes received CT_Request packet will build corresponding mapping relations of TCCR in the local node and give a point-to-point response by CT_Response packet to Node A.

All nodes on a ring will wait to be assigned CUT during engineering operation period. After issuing CT_Request packet, Node A will automatically send CT_Request packet again after retransmit timer (it is programmable, named for Timer_ct) if Node A does not receive corresponding CT_Response packet. It is believed that Node B is not reachable after N times of retransmission (N_ct is programmable also).

If Node A has received a message of CT_Response packet with a Null parameter from Node B either before CT retransmit expired or before N times of retransmission, it is believed that ICT operation for Node B is successful.

5.8.3 Configuration Table Inquiry (CTI) Operation

CT_Request packet with a Null parameter is sent to other nodes (called one of them Node B) by unicasting/multicasting/broadcasting mode from a node (called Node A, e.g. Central station in the most case) by network management interface during normal engineering operation period. All nodes received CT_Request packet with a Null parameter will give a point-to-point response by CT_Response packet with a CTI parameter reflecting actual configuration table of the local node on MSR ring to Node A.

5.9 Fault Management

If a fault occurs, Fault_Report packet with a fault parameter defined in 7.9.2 is sent to designated node (connected to network management interface). The network management entity can pass Fault_Request Packet with a fault parameter defined in 7.9.2 from designated node to a targeted node. The targeted node issues Fault_Response Packet with a fault parameter defined in 7.9.2 to designated node as a responding.

5.10 Performance Management

Once 15 minutes or 24 hours expired, each node in a ring will issue Performance_Report packet with a performance parameter defined in 7.9.2 to designated node (connected to network management interface). The network management entity can pass Performance_Request Packet with a performance parameter defined in 7.9.2 from designated node to a targeted node if needed anytime. The targeted node responds by Performance_Response Packet with a performance parameter defined in 7.9.2 to designated node.

Figure 6:
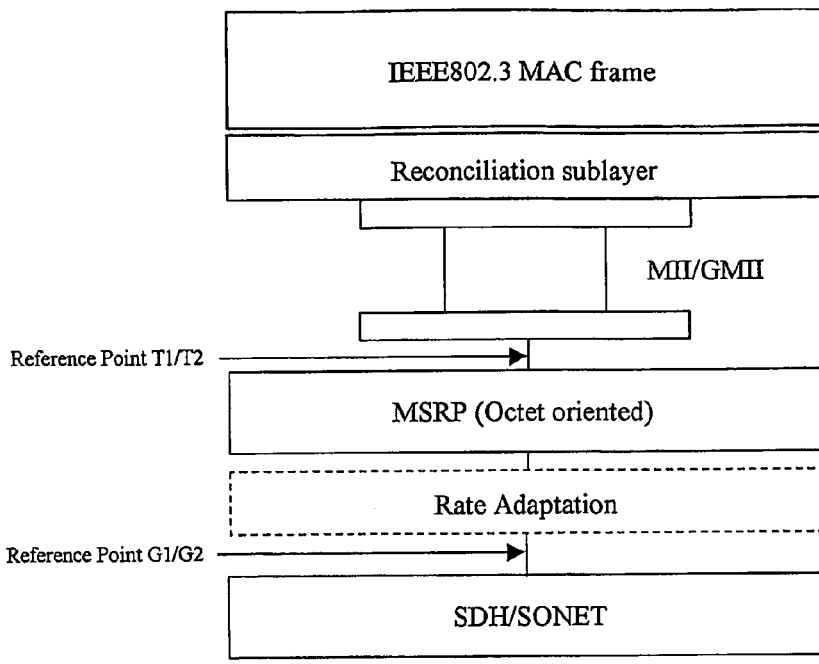
FIG. 6 is Protocol Stack of Ethernet over SDH/SONET using MSRP in SDH/SONET based Aggregate Pipe.
Figure 7:
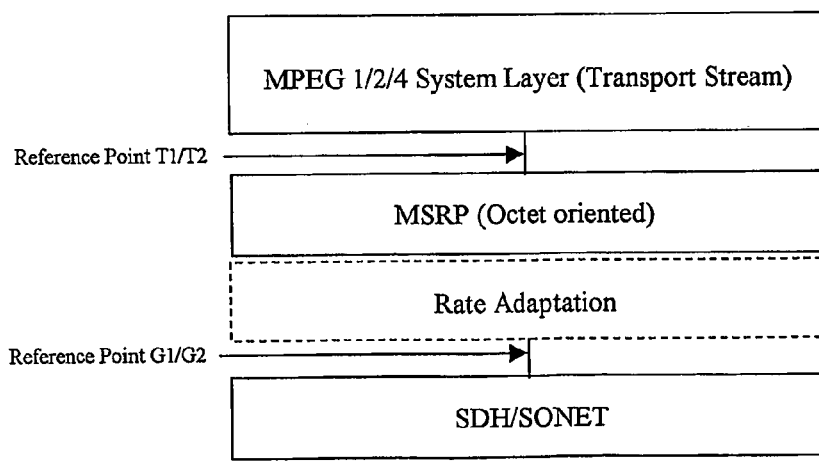
FIG. 7 illustrates Protocol Stack of DVB frame over SDH/SONET in SDH/SONET based Aggregate Pipe.
Figure 8:
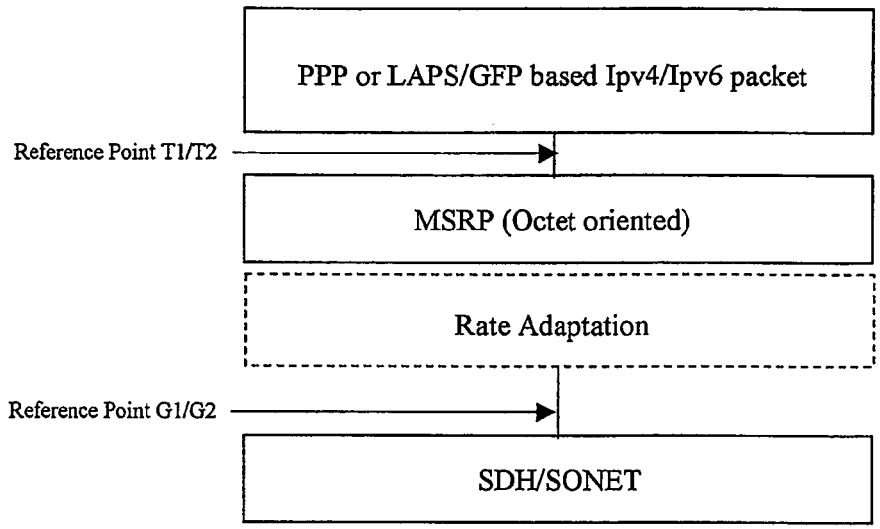
FIG. 8 is Protocol Stack of POS frame over SDH/SONET in SDH/SONET based Aggregate Pipe.
Figure 9:
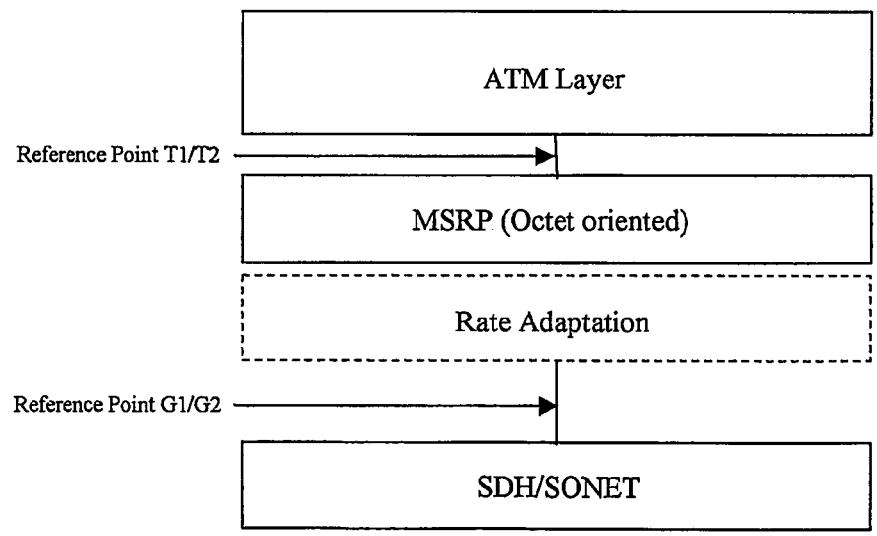
FIG. 9 illustrates Protocol Stack of ATM frame over SDH/SONET in SDH/SONET based Aggregate Pipe.
Figure 10:
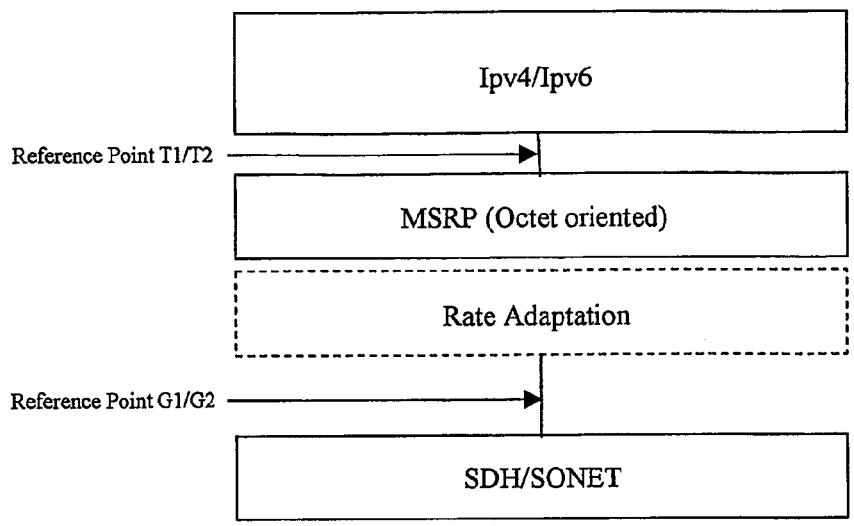
FIG. 10 illustrates Protocol Stack of IP over SDH/SONET using MSRP in SDH/SONET based Aggregate Pipe, it will be used to network management, control signalling and Layer 3 forwarding packet.

6 The Protocol Framework of Aggregate Pipe 6.1 The Protocol Framework of SDH/SONET Based Aggregate Pipe FIG. 6 is the protocol framework of MSRP (Octet-oriented) of SDH/SONET aggregate pipe. It is the same as X.86/Y.1323 when LAPS is replaced by MSRP. This Invention treats SDH transport as an octet-oriented synchronous point-to-point full-duplex link. The SDH frame is an octet-oriented synchronous multiplex mapping structure that specifies a series of standard rates, formats and mapping methods. The use of control signals is not required. The self-synchronous scrambling/descrambling ($X^{43}+1$) function is applied during insertion/extraction into/from the synchronous payload envelope. Communication service facilities between MSRP (Octet-oriented) and physical layer are accomplished by means of primitives (PH-DATA request and PH-DATA indication) according to the principle of ITU-T Recommendation X.211. Specification of Primitives specifies the interaction between MSRP and physical layer to invoke and provide a service, and presents the elements.

The data link protocol is MSRP (Octet-oriented), which provides point-to-point transferring over SDH virtual containers (including contiguous concatenation or virtual concatenation) and interface rates. The supported MSRP is connection-less-mode service. Communications between data link and the associated upper protocols are accomplished by means of primitives according to the principle of ITU-T Recommendation X.212.

The service facility of MSRP (Octet-oriented) provided to other upper protocols via SAP (Service Access Point) is the DL-UNACK-DATA request primitive with "User data" (data packet in Tributary and L3 forwarding part or packet of CS & NM) and "Priority" parameter set in a node from configuration, and the DL-UNACK-DATA indication primitive with "User data" (data packet in Tributary and L3 forwarding part or packet of CS & NM) and "Priority" parameter from received packet. "User data" is the outgoing/incoming upper layer packet. The default maximum packet size of MSRP shall be capable of supporting an information field of 1 600 octets (at least).

All packets start and end with the flag sequence consisting of one 0 bit followed by six contiguous 1 bits and one 0 bit. The flag preceding the destination node address field is defined as the opening flag. The flag following the Frame Check Sequence (4-octet FCS) field is defined as the closing flag. The closing flag also serves as the opening flag of the next frame, in some applications. However, all receivers shall be able to accommodate receipt of one or more consecutive flags. The Flag Sequence shall be transmitted during inter-frame time fill.

If the Rate Adaptation is needed in the MSRP (Octet-oriented) transmit processing, transmit entity adds the rate-adaptation octet(s) "0xdd" within the packet by sending sequence(s) of {0x7d, 0xdd}. This function is performed just after transparency processing and before the end flag is added. In receive direction, receive entity will remove the Rate Adaptation octet(s) "0xdd" within the MSRP packet when detecting sequence(s) of {0x7d, 0xdd}, This function will be done just before transparency processing and after the end flag is detected.

An octet stuffing procedure is applied for SDH/SONET Aggregate Pipe. Each packet begins and ends with the flag 0x7E. A transmitting data link layer entity of MSRP (Octet-oriented) shall examine the frame content between the opening and closing flag sequences (Destination Node Address, Time to Live, U/M/B, FWR/SWR, Priority, TT, TSN, CS & NM, Payload or CS & NM parameters, and FCS fields) during transmission; if the flag sequence occurs, it shall be converted to the sequence 0x7D 0x5E. Occurrence of 0x7D is transformed to 0x7D 0x5D also. At the receiver, the stuff patterns are removed and replaced with the original fields. An invalid packet is a packet which:
 a) is not properly bounded by two flags; or
 b) has fewer than sixteen octets between flags of packets; or
 c) contains a FCS error; or
 d) contains a NA, U/M/B, TT or TSN which are mismatched or not supported by the receiver.
 e) has an invalid control sequence, i.e. {0x7d, ZZ} where ZZ octet is not 5d, 5e, 7e, dd (Rate Adaptation).

Invalid packet shall be discarded without notification to the sender. No action is taken as the result of that packet.

The connection management entity is used optionally to monitor the link status of receiving the peer link packet. It is local matter only and has not any associated packet to be used between the two sides.

After initialization (the defaults of T200 and N200 are set to 10 milliseconds and 3 respectively), the MSRP entity enters the normal way of transmitter and receiver.
 If the timer T200 expires before any packet (including data/CS & NM packet and inter-packet time fill) is received, the MSRP entity shall restart timer T200 and decrement the retransmission counter N200.
 If timer T200 expires and retransmission counter N200 has been decremented to zero before any packet is received, the MSRP entity shall indicate this to the local connection management entity by means of the MDL-ERROR indication primitive, and restart timer T200 and recover the value of N200.
 The value of T200 and N200 shall be configurable. The minimum unit configured of T200 and N200 is 5 milliseconds and 1 respectively.

MSRP (Octet-oriented) entity accepts frames from the MAC layer through the Reconciliation sublayer and an equivalent MII (Media Independent Interface). No address filtering function is used here. The format of MSRP (Octet-oriented) payload field is defined in the shaded region of FIG. 6 in ITU-T X.86/Y.1323. The order of those octets and bits shaded area as shown is kept intact. The function unit of MSRP forwards all incoming MSRP packets to its peer connected to link along a ring except the originating link port, and is permitted to buffer one or more incoming packets before forwarding them.

Protocol stacks of DVB frame over SDH/SONET, POS frame over SDH/SONET, ATM Cell Frame over SDH/SONET and IP over SDH/SONET using MSRP (Octet-oriented) are shown in FIG. 7, FIG. 8, FIG. 9 and FIG. 10 respectively. The reference point G1/G2 and T1/T2 is reflected in and is corresponded to FIG. 5 and section 5.4.

6.2 The Protocol Framework of 10GE Based Aggregate Pipe

Figure 11:
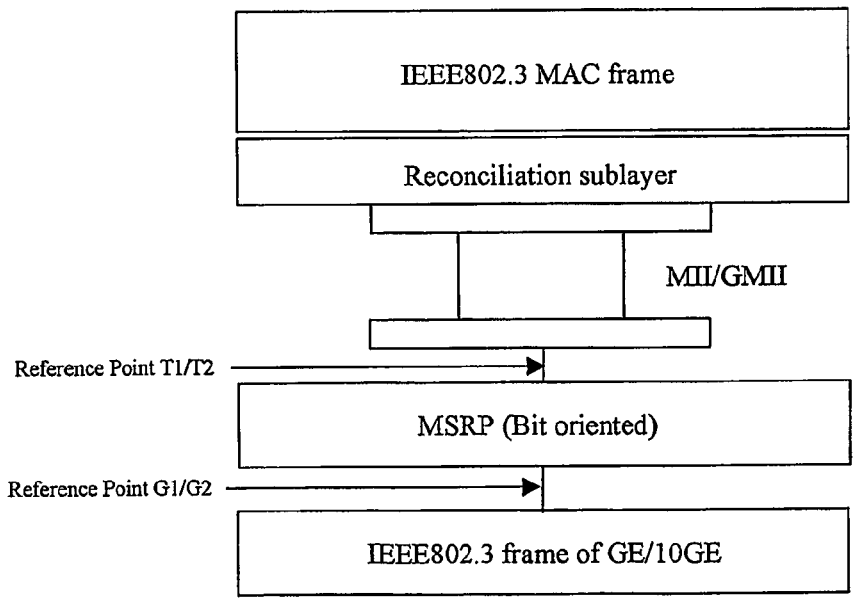
FIG. 11 shows Protocol Stack of Ethernet over GE/10GE in GE/10 GE based Aggregate Pipe.
Figure 12:
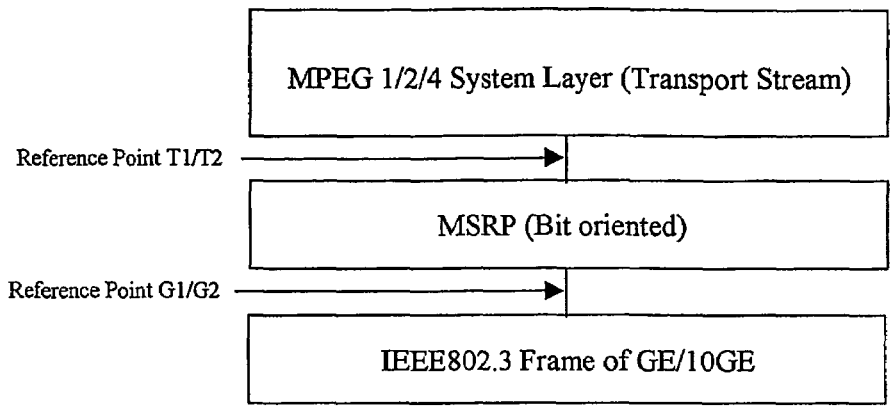
FIG. 12 illustrates Protocol Stack of DVB frame over GE/10GE in GE/10 GE based Aggregate Pipe.
Figure 13:
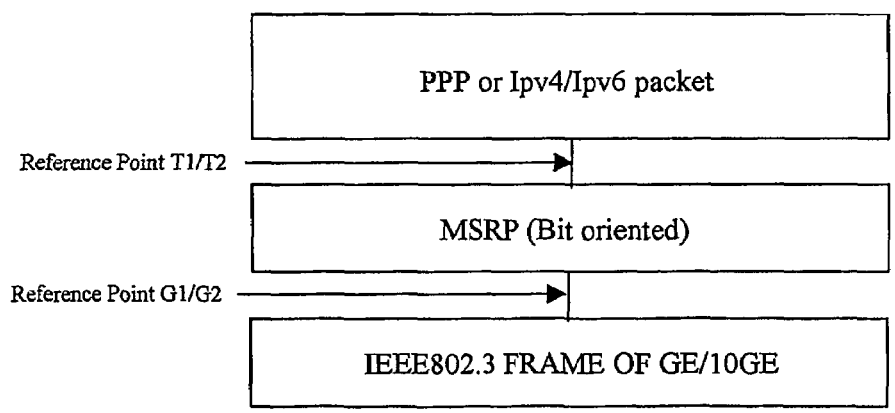
FIG. 13 illustrates Protocol Stack of POS frame over GE/10GE in GE/10 GE based Aggregate Pipe.
Figure 14:
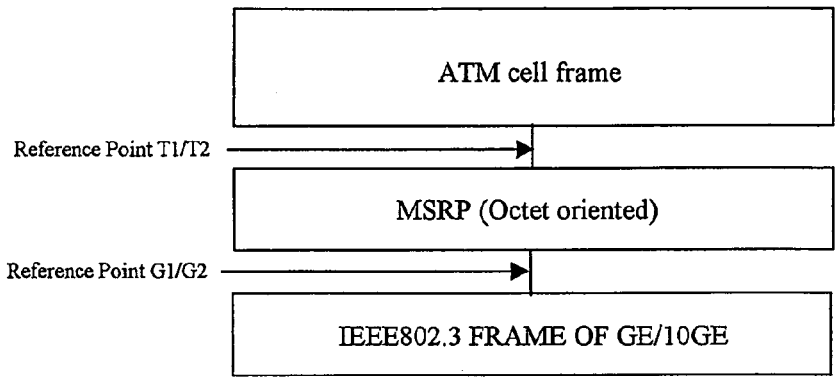
FIG. 14 illustrates Protocol Stack of ATM frame over GE/10GE in GE/10 GE based Aggregate Pipe.
Figure 15:
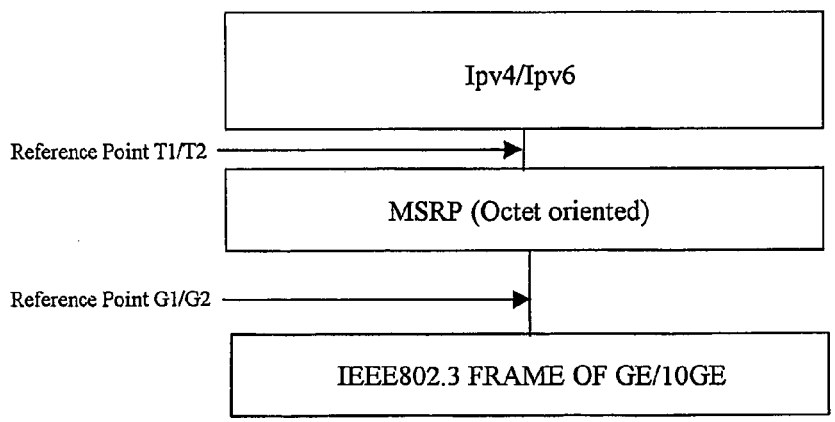
FIG. 15 is Protocol Stack of IP over Ethernet in GE/10GE based Aggregate Pipe, it will be used to network management, control signalling and Layer 3 forwarding packet.

FIG. 11 is the protocol framework of MSRP (Bit-oriented) of 10GE based. It has the same position as Logical Link Control protocol defined in IEEE802.2. This Invention treats MSRP as a upper layer protocol of Ethernet MAC of point-to-point full-duplex. The use of control signals is not required. The self-synchronous scrambling/descrambling ($X^{43}+1$) function is not applied during insertion/extraction into/from the MAC payload. Communication service facilities between MSRP (Bit-oriented) and MAC layer are accomplished by means of primitives (MAC-DATA request and MAC-DATA indication) according to the principle of ITU-T Recommendation X.211. Specification of Primitives specifies the interaction between MSRP and MAC layer to invoke and provide a service, and presents the elements.

The supported MSRP (Bit-oriented) is connection-less-mode service. Communications between data link and the associated upper protocols are accomplished by means of primitives according to the principle of ITU-T Recommendation X.212.

The service facility of MSRP (Bit-oriented) provided to other upper protocols via SAP (Service Access Point) is the DL-UNACK-DATA request primitive with "User data" (data packet in Tributary and L3 forwarding part or packet of CS & NM) and "Priority" parameter set in a node from configuration, and the DL-UNACK-DATA indication primitive with "User data" (data packet in Tributary and L3 forwarding part or packet of CS & NM) and "Priority" parameter from received packet. "User data" is the outgoing/incoming upper layer packet. The default maximum packet size of MSRP shall be capable of supporting an information field of 1 500 octets in this case.

The opening flag, the closing flag, octet stuffing procedure and Rate Adaptation will not be used in this case.

An invalid packet is a packet which:
 a) is not properly bounded by two flags; or
 b) has fewer than sixteen octets between flags of packets; or
 c) contains a FCS error; or
 d) contains a NA, U/M/B, TT or TSN which are mismatched or not supported by the receiver.

Invalid packet shall be discarded without notification to the sender. No action is taken as the result of that packet.

The connection management entity is used optionally to monitor the link status of receiving the peer link packet. It is local matter only and has not any associated packet to be used between the two sides.

After initialization (the defaults of T200 and N200 are set to 10 milliseconds and 3 respectively), the MSRP entity enters the normal way of transmitter and receiver.
 If the timer T200 expires before any packet (including data/CS & NM packet and inter-packet time fill) is received, the MSRP (Bit-oriented) entity shall restart timer T200 and decrement the retransmission counter N200.

If timer T200 expires and retransmission counter N200 has been decremented to zero before any packet is received, the MSRP (Bit-oriented) entity shall indicate this to the local connection management entity by means of the MDL-ERROR indication primitive, and restart timer T200 and recover the value of N200.

The value of T200 and N200 shall be configurable. The minimum unit configured of T200 and N200 is 5 milliseconds and 1 respectively.

MSRP entity accepts DVB/ATM/POS/upper layer frames from the upper layer (e.g. through the Reconciliation sublayer and an equivalent MII for Ethernet of upper layer). No address filtering function is used here. The format of MSRP (Bit-oriented) payload field is defined in the shaded region of FIG. 6 in ITU-T X.86/Y.1323. The order of those octets and bits shaded area as shown is kept intact. The function unit of MSRP forwards all incoming MSRP packets to its peer connected to link along a ring except the originating link port, and is permitted to buffer one or more incoming packets before forwarding them.

Protocol stacks of DVB frame over 10GE, POS frame over 10GE, ATM Cell Frame over 10GE and IP over 10GE using MSRP (Bit-oriented) are shown in FIG. 12, FIG. 13, FIG. 14 and FIG. 15 respectively. The reference point G1/G2 and T1/T2 is reflected in and is corresponded to FIG. 5 and section 5.4 also.

Figure 16:
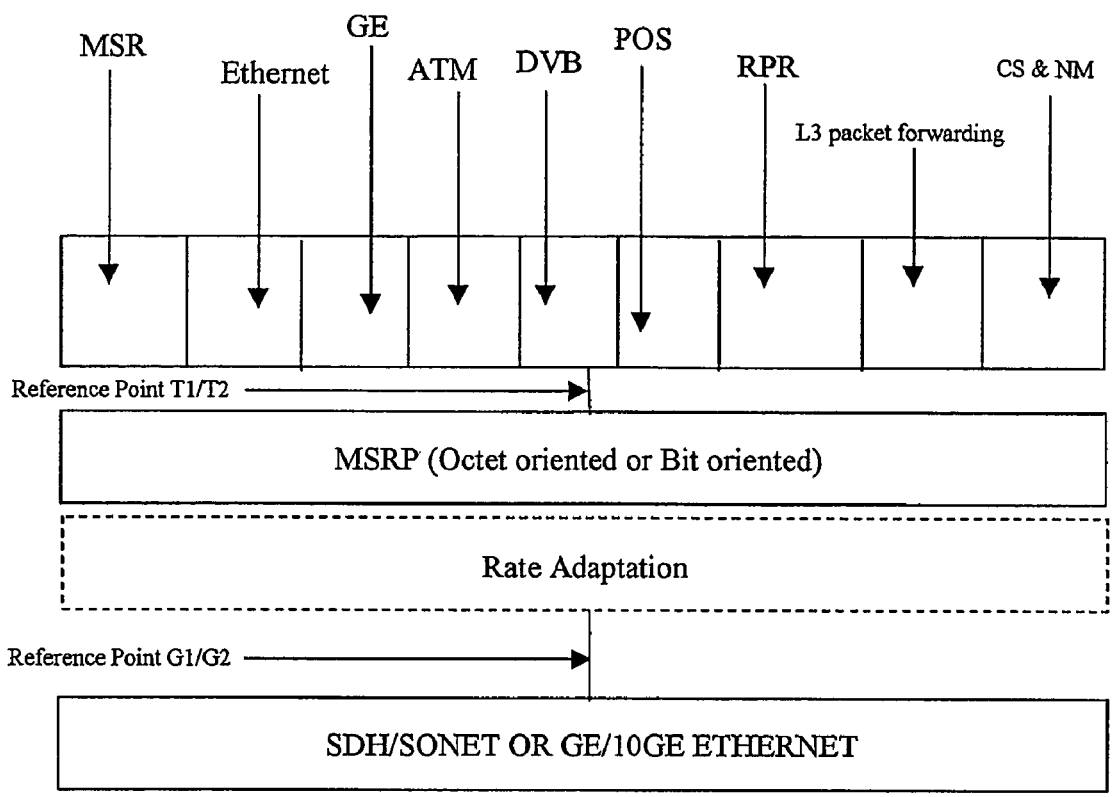
FIG. 16 is Generic Protocol Stack of MSR.

MSR can provide a set facility of access Ethernet (10/100 Mb/s), Gigabit Ethernet, DVB (MPEG1/2/4), ATM (STM-1/OC-3 and STM-4/OC-12) POS (STM-1/OC-3 and STM-4/OC-12), RPR (Resilient Packet Ring), MSR ring, Layer 3 packet forwarding and CS& NM over MSRP as shown in FIG. 16. FIG. 16 is generic protocol framework of MSR, including MSRP of octet-oriented and bit-oriented.

6.3 Tributary Adaptation Function Unit

Tributary Adaptation Function Unit is an adaptation function from/to various independent tributary type signals to/from reference point T1/T2. It has Tributary Adaptation Source Function and Tributary Adaptation Sink Function. Sink corresponds to reference point T1, source to reference point T2. This adaptation function can include the signal and rate transform, synchronous function between two sides.

7 Generic MSR Packet Format

Figure 17:
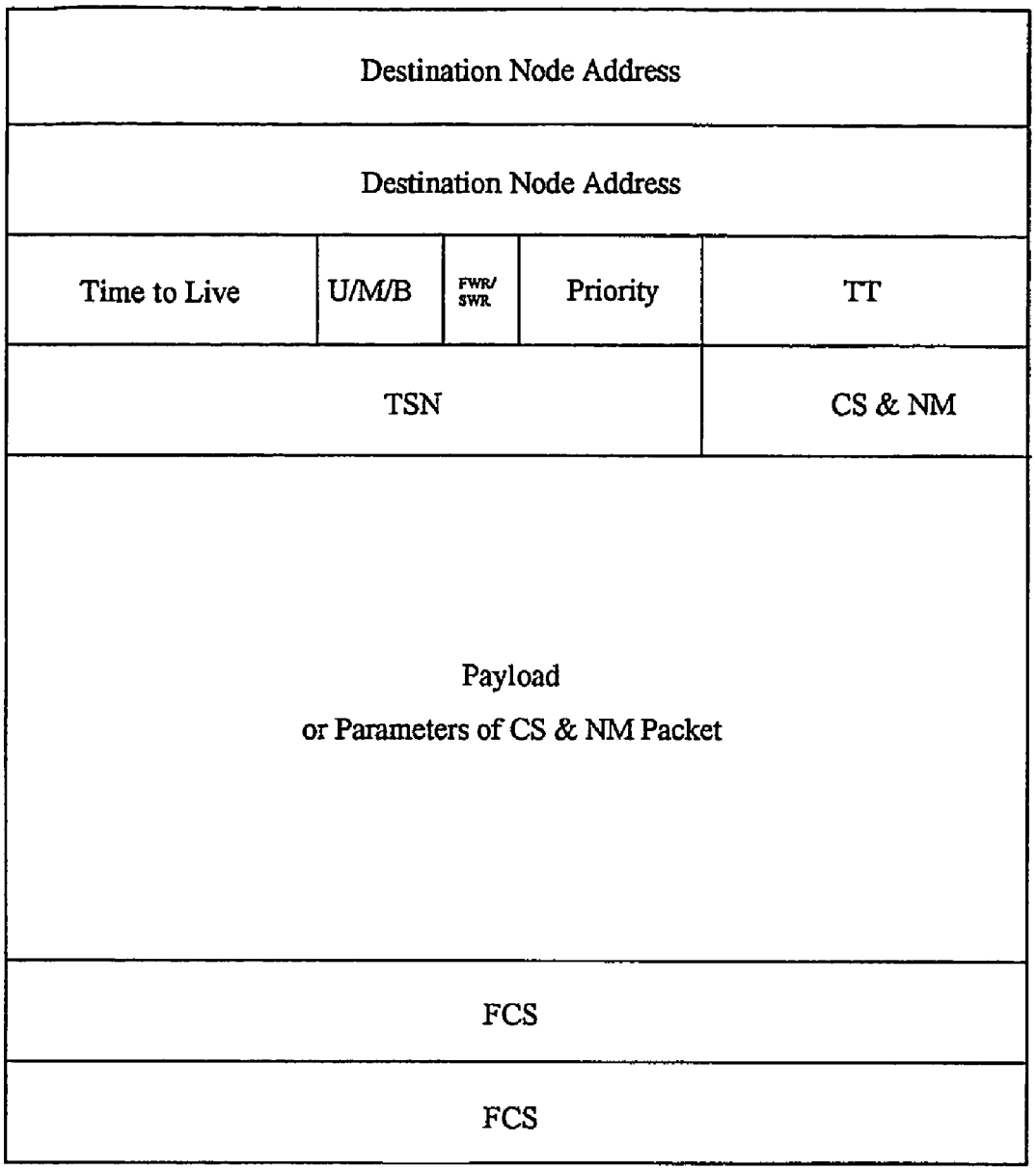
FIG. 17 is Generic Packet Format of MSR.

Each MSRP packet uses a fixed sized header. The generic packet format is shown in FIG. 17.

The said fields are described below.

7.1 Destination Node Address

This 32-bit field is an address of Node Link on the MSR ring. NA is a local address and has local meaning only along the MSR ring. It contains 4 octets. Each bit (binary "0" or "1") corresponds to a node. For example, the binary "00100000 00000000 00000000 00000000" stands for the $3^{rd}$ Node Address (station), the binary "00000100 00000000 00000000 00000000" stands for the $6^{th}$ Node Address (station) (refer to FIG. 4). You may also use binary "00000010 00000000 00000000 00000000" to stand for 7th Node Address of new insertion and the actual sequence location of the $7^{th}$ Node Address may be corresponded to middle position between Node 1 and Node 2 shown in FIG. 4 since the MSR supports online node insertion. All Node Address must be leftward alignment and be pre-installed by (NVROM) before engineering operation. The maximum node number of the MSR Ring is 32. For implementation, people can use Ethernet MAC and Ipv4/Ipv6 address to perform external network management.

7.2 Time to Live

This 5-bit field is a count of hops that must be decremented every time of forwarding a packet from a node on MSR ring.

7.3 FWR/SWR Bit

This single bit field indicates on which ring this packet is assigned to run. "0" and "1" stand for FWR and SWR respectively.

7.4 U/M/B Field

The U/M/B stands for Unicasting/Multicasting/Broadcast. This 2-bit field is defined as Table 3.

TABLE 3

| X.msr - Codes of U/M/B field | |
| --- | --- |
| U/M/B | Codes |
| Reserved | 00 |
| Unicasting | 01 |
| Multicasting | 10 |
| Broadcast | 11 |

7.5 Priority

This 7-bit field reflects priority level of MSRP packet from 0 to 7. The value of priority is determined by manual setting of configuration using network management interface before engineering installation according to Service Level Agreement from carrier at the Tx side in a node. The larger the value is, the higher the priority is. It may also be modified online during service operation by using CT_Request and CT_Response packets.

7.6 Tributary Type (TT)

This 5-bit field stands for a type of an independent adding/dropping tributary channel to/from the MSR nodes, Layer 3 forwarding packet, Control Signalling and Network management packet. Tributary channel can be Ethernet, Gigabit Ethernet, DVB, POS and ATM etc. Its codes are as follows (see Table 4).

TABLE 4

| X.msr - TT Code | |
| --- | --- |
| Tributary types | Code |
| Reserved | 00000-00100 |
| Ethernet (10 Mb/s, specified in IEEE802.3) | 00100 |
| Ethernet (100 M/b/s, specified in IEEE802.3) | 00101 |
| GE (specified in IEEE802.3) | 00110 |
| DVB, MPEG 1 System Layer (transport stream) | 00111 |
| DVB, MPEG 2 System Layer (transport stream) | 01000 |
| STM-1/OC-3c ATM | 01001 |
| STM-4c/OC-12c ATM | 01010 |
| STM-1/OC-3c POS | 01011 |
| STM-4c/OC-12c POS | 01100 |
| L3 Forwarding Packet | 01101 |
| CS & NM Packet | 01110 |
| MSR (e.g. MSR of STM-16/OC48 into STM-64/OC-192 aggregate pipe) | 01111 |
| RPR (e.g. Resilient Packet Ring of STM-16/OC48 into STM-64/OC-192 aggregate pipe) | 10000 |
| Reserved | 10001-11111 |

Note:
the code of 10/100 M auto-sense Ethernet is "00101" also.

7.7 Tributary Sequence Number (TSN)

This 11-bit field is a sequence number of same type of Tributary Port on a node. TSN is 7 (Binary 00000000111) if the 7th Ethernet is provided in a node for example.

7.8 CS & NM Field

This 5-bit field is used to identify the types of control signalling and network management packet shown in Table 5.

TABLE 5

X.msr - Type of Control Signalling and Network Management Packet

| CS&NM Packet Types | Code |
|---|---|
| MSRP Data Packet (L3 forwarding packet is also included) | 00000 |
| Topology Discovery Packet | 00001 |
| L2PS_Request Packet | 00010 |
| L2PS_Response Packet | 00011 |
| L2PS_Event_Report | 00100 |
| WTR_Request Packet | 00101 |
| CT_Request Packet | 00110 |
| CT_Response Packet | 00111 |
| Fault_Report Packet | 01000 |
| Fault_Inquiry_Request Packet | 01001 |
| Fault_Inquiry_Response Packet | 01010 |
| Performance_Report Packet | 01011 |
| Performance_Inquiry_Request | 01100 |
| Performance_Inquiry_Response | 01101 |
| Reserved | 01110-11111 |

7.9 Payload

When Tributary or Node Layer 3 Forwarding Packet is applied, payload field is used to encapsulate upper layer protocols listed in Table 4. Payload is octet-oriented and its size is variable. The default maximum packet size shall be capable of supporting an information field of 1 600 octets (at least) for both IPv4-based and IPv6-based applications. Except for Tributary, the payload of Layer 3 forwarding packet, control signalling packet and network management is described below.

7.9.1 Node Layer 3 Forwarding Part

Layer 3 forwarding Packet is a packet used to forward data packet in a node. This packet is different from those packets of reaching all Tributary in a node, is also different from network management packets and control signalling packets. Logically, a MSR node can be treated as a router of performing Layer 3 forwarding when a Layer 3 forwarding Packet is forwarded according to routing table and routing protocols of IPv4/IPv6 in a node from the node to other node along the MSR ring.

7.9.2 Control Signalling and Network Management Part

Figure 18:
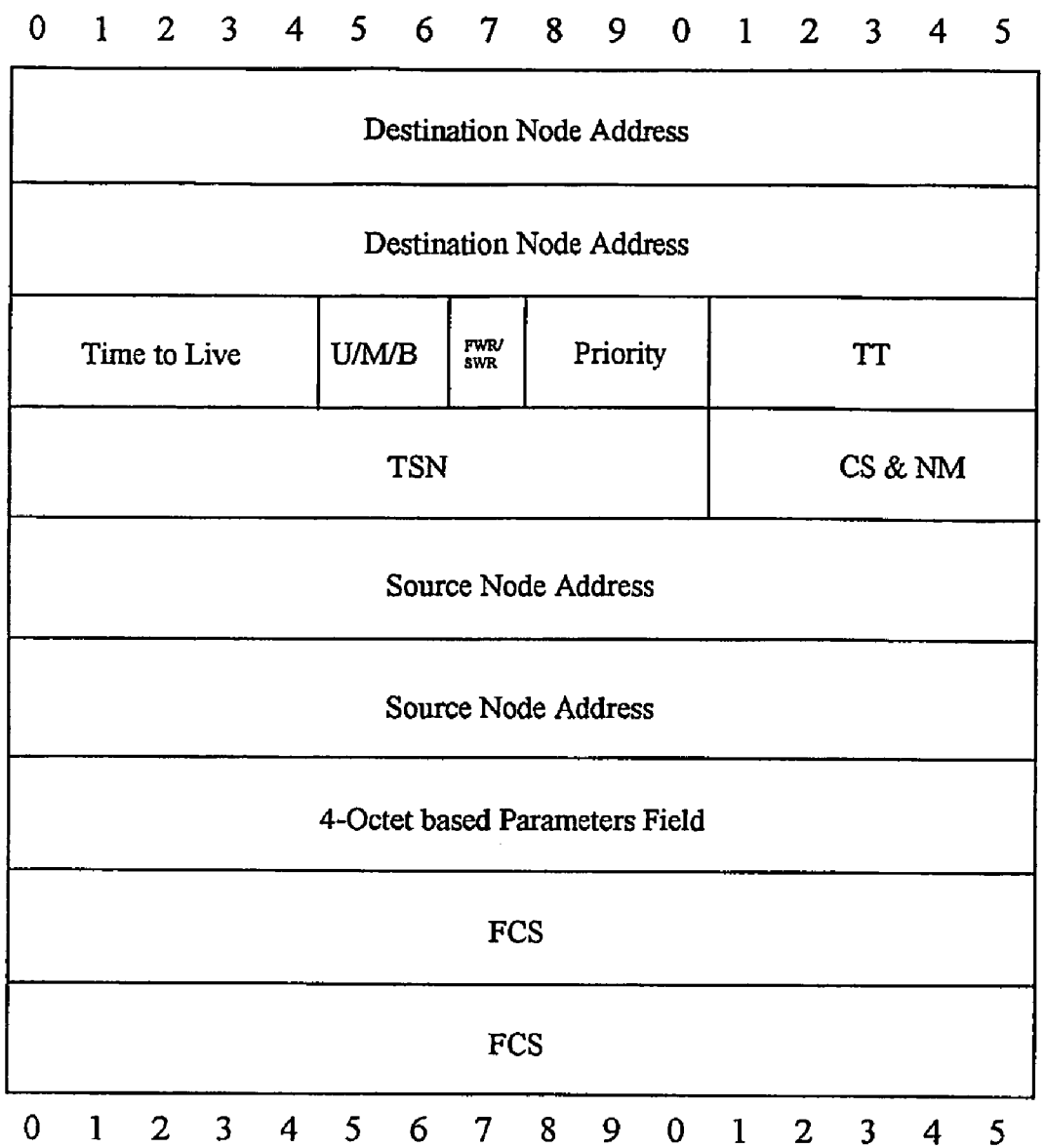
FIG. 18 is Generic Format of CS & NM Packets.

The MSR protocol does work by sending both data packet and the associated network management/control packets in FWR, sending both data packet and the associated network management/control packets in SWR also. Generic format of CS & NM Packets is shown in FIG. 18. The parameter field is 4-octet based. The difference of the parameter field indicates various control signalling and network management packets below. The first octet of parameters field is used to identify how many parameters are used by CS & NM packet. Each parameter following $1^{st}$ octet consists of type (or tag), length and value of parameter. If the total octet number of parameters field is not based on 4-octet, the octet padding (Binary 00000000) will be used.

7.9.2.1 Topology Discovery Packet

The initial TTL value should be the total number of actual working stations and is determined by provisioning during project installation. The operation of Topology_Discovery_Request and Topology_Discovery_Response Packet is shown in 5.7.1 and Table 6 gives a Null parameter. U/M/B field is set to broadcasting and priority is 7 (highest).

TABLE 6

X.msr - Parameter Type of Topology_Discovery_Request and Topology_Discovery_Response Packets

| Parameter type | Value of Parameter Field |
|---|---|
| Null | Binary "00000001 00000000 00000000 00000000 + 00000000 (padding)" |

7.9.2.2 Parameters of L2PS_Request Packet

The First and Second Parameter Type of L2PS_Request Packet has Forced Switch, PSF, PSD and Manual Switch Its value is defined as Table 7 and Table 8. The corresponding operation can be got in 5.7.2 and 5.7.3.

TABLE 7

X.msr - First Parameter Type of L2PS_Request Packet

| Parameter type | Value of Parameter Field |
|---|---|
| Forced_Switch | Binary "00000001 00000100 00000001 00000000" |
| PSF | Binary "00000001 00000011 00000001 00000000" |
| PSD | Binary "00000001 00000010 00000001 00000000" |
| Manual_Switch | Binary "00000001 00000001 00000001 00000000" |

TABLE 8

X.msr - Second Parameter Type of L2PS_Request Packet

| Parameter type | Value of Parameter Field |
|---|---|
| FWR_Fiber_Cut | Binary "00000001 00000110 00000001 00000000" |
| SWR_Fiber_Cut | Binary "00000001 00000101 00000001 00000000" |

7.9.2.3 Parameters of L2PS_Response Packet

The Parameter Type of L2PS_Request Packet has Successful_Switch, or Unsuccessful_Switch. Its value is defined as Table 9. The corresponding operation can be got in 5.7.3.

TABLE 9

X.msr - Parameter Type of L2PS_Response Packet

| Parameter type | Value of Parameter Field |
|---|---|
| Successful_Switch | Binary "00000001 00001000 00000001 00000000" |
| Unsuccessful_Switch | Binary "00000001 00000111 00000001 00000000" |

7.9.2.4 Parameters of L2PS_Event_Report Packet

The Parameter Type of L2PS_Event_Report Packet has Successful_Switch, or Unsuccessful_Switch. Its value is defined as Table 10, Table 11 and Table 12. The corresponding operation can be got in 5.7.3.

TABLE 10

X.msr - First Parameter Type of L2PS_Event_Report Packet

| Parameter type | Value of Parameter Field |
|---|---|
| Forced Switch | Binary "00000001 00000100 00000001 00000000" |
| PSF | Binary "00000001 00000011 00000001 00000000" |
| PSD | Binary "00000001 00000010 00000001 00000000" |
| Manual Switch | Binary "00000001 00000001 00000001 00000000" |

TABLE 11

X.msr - Second Parameter Type of L2PS_Event_Report Packet

| Parameter type | Value of Parameter Field |
|---|---|
| FWR_Fiber_Cut | Binary "00000001 00000110 00000001 00000000" |
| SWR_Fiber_Cut | Binary "00000001 00000101 00000001 00000000" |

TABLE 12

X.msr - Second Parameter Type of L2PS_Event_Report Packet

| Parameter type | Value of Parameter Field |
|---|---|
| L2PS_State | Binary "00000001 00001010 00000001 00000000" |
| Normal_State | Binary "00000001 00001001 00000001 00000000" |

7.9.2.5 Parameters of WTR_Request Packet

The corresponding operation can be got in 5.7.3 and parameter is shown in Table 13.

TABLE 13

X.msr - Parameter Type of WTR_Request Packet

| Parameter type | Value of Parameter Field |
|---|---|
| Successful_WTR | Binary "00000001 00001011 00000001 00000000" |

7.9.2.6 CT_Request Packet

The major portion of CT is TCCR ID. A TCCR ID consists of TSNi ID, 2-bit U/M/B field, 6-bit length field and one or more TSNj ID. ID is value of identifier, TSNi, TSNj, TSNk and TSNm are the ith Tributary Sequence Number of same TT of Node n, the jth Tributary Sequence Number of same TT of Node o, the kth Tributary Sequence Number of same TT of Node p and the mth Tributary Sequence Number of same TT of Node q.

The ICT, CUT and Null parameters indicate three different operations: ICT, CUT and CTI. Its type and field are described below in Table 14.

TABLE 14

X.msr - Parameter Type of CT_Request Packet

Figure 19:
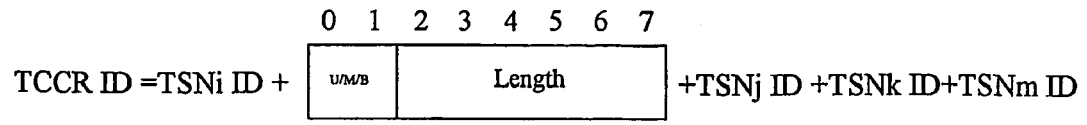
FIG. 19 is EXPRESSIONS OF TSN ID AND TCCR ID.
Figure 19:
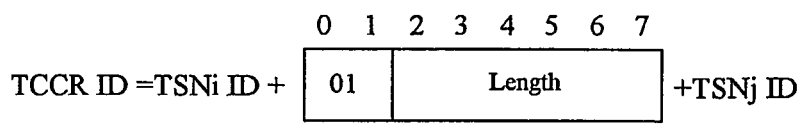

| Parameter type | Parameter Field |
|---|---|
| ICT | Binary "00000001 00100000 +" octet number of parameter" +" value of TCCR ID shown in FIG. 19" |

TABLE 14-continued

X.msr - Parameter Type of CT_Request Packet

| Parameter type | Parameter Field |
|---|---|
| CUT | Binary "00000001 00100001 +" octet number of parameter" +" value of TCCR ID shown in FIG. 19" |
| Null | Binary "00000001 00100011 00000001 00000000" |

7.9.2.7 CT_Response Packet

Null parameter is used by ICT and CUT operation. CTI parameter is followed by CTI operation.

TABLE 15

X.msr - Parameter Type of CT_Request Packet

| Parameter type | Parameter Field |
|---|---|
| CTI | Binary "00000001 00100100 +" octet number of parameter" +" value of TCCR ID shown in FIG. 19" |
| Null | Binary "00000001 00100011 00000001 00000000" |

The corresponding operation can be got in 5.8 and parameter is shown in Table 15.

7.9.2.8 Fault_Report Packet

TABLE 16

X.msr - Parameter Type of Fault_Report Packet

| Parameter type | Parameter Field |
|---|---|
| PSF | Binary "00000001 00000011 00000001 00000000" |
| PSD | Binary "00000001 00000010 00000001 00000000" |

The corresponding operation can be got in 5.9 and parameter is shown in Table 16.

7.9.2.9 Parameter of Fault_Inquiry Request Packet

TABLE 17

X.msr - Parameter Type of Fault_Inquiry_Request Packet

| Parameter type | Parameter Field |
|---|---|
| Null | Binary "00000001 00100011 00000001 00000000" |

The corresponding operation can be got in 5.9 and parameter is shown in Table 17.

7.9.2.10 Parameter of Fault_Inquiry_Response Packet

TABLE 18

X.msr - Parameter Type of Fault_Inquiry_Request Packet

| Parameter type | Parameter Field |
|---|---|
| PSF | Binary "00000001 00000011 00000001 00000000" |
| PSD | Binary "00000001 00000010 00000001 00000000" |

The corresponding operation can be got in 5.9 and parameter is shown in Table 18.

7.9.2.11 Parameter of Performance_Report Packet

TABLE 19

X.msr - Parameter Type of Performance_Report Packet

| Parameter type | Parameter Field |
|---|---|
| A set of TSNi in a node (designated) | Binary "00000001 01000000 +" octet number of parameter" +" value of TSNi shown in FIG. 19" |
| TNFCS_15 m (Total Number of FCS in 15 minutes, 4octets, 4octets length) | Binary "00000001 01000001 00000100" value of TNFCS-15 m shown in FIG. 19" |
| TNPL_15 m (Total Number of Packet Loss in 15 minutes, 4octets length) | Binary "00000001 01000001 00000100" value of TNPL-15 m shown in FIG. 19" |
| TNFCS_24 h (Total Number of FCS m 24 hours, 5octets length) | Binary "00000001 01000001 00000101" value of TNFCS-24 h shown in FIG. 19" |
| TNPL_24 h (Total Number of Packet Loss in 24 hours, 5octets length) | Binary "00000001 01000001 00000101" value of TNPL-24 h shown in FIG. 19" |

The corresponding operation can be got in 5.10 and parameter is shown in Table 19.

7.9.2.12 Parameter of Performance_Inquiry_Request Packet

TABLE 20

X.msr - Parameter Type of Performance_Inquiry_Request Packet

| Parameter type | Parameter Field |
|---|---|
| A set of TSNi in a node (designated) | Binary "00000001 01000000 +" octet number of parameter" +" value of TSNi shown in FIG. 19" |

The corresponding operation can be got in 5.10 and parameter is shown in Table 20.

7.9.2.13 Parameter of Performance_Inquiry_Response Packet

TABLE 21

X.msr - Parameter Type of Performance_Inquiry_Response Packet

| Parameter type | Parameter Field |
|---|---|
| A set of TSNi in a node (designated) | Binary "00000001 01000000 +" octet number of parameter" +" value of TSNi shown in FIG. 19" |
| TNFCS_15 m (Total Number of FCS in 15 minutes, 4octets length) | Binary "00000001 01000001 00000100" value of TNFCS-15 m shown in FIG. 19" |
| TNPL _15 m (Total Number of Packet Loss in 15 minutes, 4octets length) | Binary "00000001 01000001 00000100" value of TNPL-15 m shown in FIG. 19" |
| TNFCS_24 h (Total Number of FCS in 24 hours, 5octets length) | Binary "00000001 01000001 00000101" value of TNFCS-24 h shown in FIG. 19" |
| TNPL_24 h (Total Number of Packet Loss in 24 hours, 5octets length) | Binary "00000001 01000001 00000101" value of TNPL-24 h shown in FIG. 19" |

The corresponding operation can be got in 5.10 and parameter is shown in Table 21.

7.10 FCS

The Frame Check Sequence field defines as 32 bits (four octets). The FCS is transmitted least significant octet first, which contains the coefficient of the highest term. The FCS field is calculated over all bits of the Destination Node Address, Time to Live, U/M/B, Priority, TT, TSN, CS & NM, Payload (or associated parameters for CS & NM packets), not including any bits (synchronous) or octets (asynchronous or synchronous) inserted for transparency and rate adaptation. This also does not include the Flag Sequences and the FCS field itself. The end of payload or parameter(s) fields are found by locating the closing Flag Sequence and removing the Frame Check Sequence fields. Please refer to RFC 1662 for the calculation of FCS.

7.11 Security Considerations for SDH/SONET Aggregate Pipe

Due to the malicious users possibly to pass packets of some bit patterns that may lead to SONET/SDH-layer low-transition-density synchronization problems, SDH/SONET payload scrambling is needed, when the MSRP packets is inserted into the SONET/SDH Higher Order VC or its contiguous/virtual concatenation.

Figure 20A:
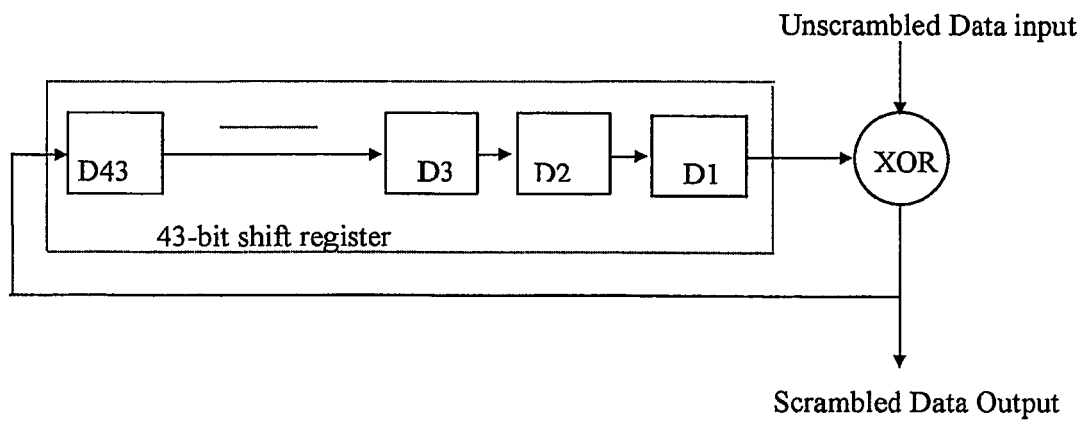
FIG. 20a is Transmitter diagram of scrambling.
Figure 20B:
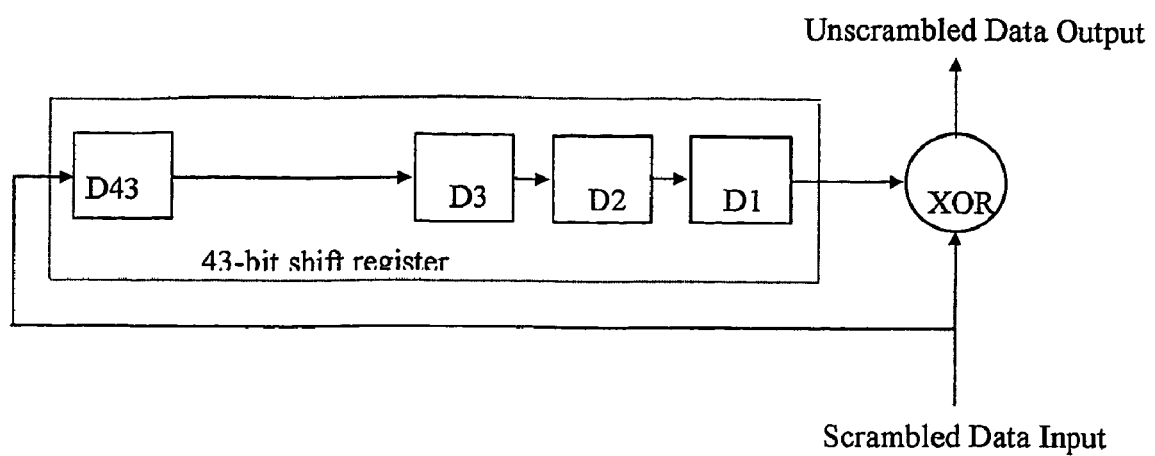
FIG. 20b is Receiver diagram of scrambling.

The operation diagram of ($X^{43}+1$) self-synchronous scrambler transmitter and receiver (see FIG. 20a and FIG. 20b are as follows. XOR is an exclusive-OR gate function. The output bits are exclusive-ored with the raw input data bit to produce the transmitted bits. The order of bit transmission within an octet is the most significant bit first. The performing scrambler and descrambler shall be required for higher order VC-n. The C2 octet coding of the high order path signal label is specified (see ITU-T Recommendation G.707) to indicate the contents of synchronous payload envelope. It is recommended that "25" (19 hex) is used to indicate MSRP with ($x^{43}+1$) scrambling.

The scrambling/descrambling is not required for 10GE aggregate pipe.

8 Filter and Schedule Function

MSR filtering function is a filtering and checking facility for packet NA and TTL. All packets reaching to the MSR filter Unit will be sent first to a buffer in the Node. The MSR node will check packet TTL and NA and perform XOR function with local NA. This packet will be taken away if TTL is zero. If its NA is match, those packets reaching destination will be processed by MSRP processor and not be sent to neighbor (except for multicast and broadcast packets) along the same ring. Otherwise, those mismatched packet will go to neighbor directly by schedule unit without any processing after decrementing TTL field. This is MSR filtering function.

MSR scheduling function is a set of functions used to MSRP protocol processing in Tx direction. It includes Tx Schedule Unit, functions of determination of NA, TTL, TT, TSN, FCS, multicasting/broadcasting according to types and port configuration of Tributary, a route of Layer 3 forwarding packet, requirement of control signalling or requirement of network management. The other associated MSRP protocol processing is also covered.

9 Node Insertion and Deletion

A node can be inserted/removed online into/from the ring by using topology discovery (5.7.1) and L2PS (5.7.2 and 5.7.3) functions while other nodes and services will be operated normally without packet loss and service loss.

10 Tributary Loopback

Once loopback function is set, a node provides local data channel from Tx interface to Rx interface in Tributary.

ANNEX A

MPEG Physical Interface (MPI)

This Annex A is referred to EN 300 429. The following functional blocks are identified:

The MPEG2-TS (Transport Stream) Physical Interface: the Network Adapter accepts, at its input/output port, an MPEG2-TS consisting of consecutive MPEG2-TS packets. Packets length of 188 octets and 204 octets can be handled.

The MPEG/MSRP Adaptation: this corresponds to the adaptation between the MPEG2-TS and the MSRP. This adaptation, besides format adaptation, provides functions for the MPEG2-TS clock transmission transparency (adaptive clock method) and information transparency using the clock and data recovery mechanism of SDH/SONET. It is expected that under normal transmission conditions the received MPEG2-TS will be quasi error free, corresponding to a Bit Error Rate (BER) of about $10^{-10}$ to $10^{-11}$ at the input of an MPEG2 equipment at the receiver site. This requirement is in accordance with the standards for the DVB systems using cable systems (see ETS 300 429).

It allows the simultaneous transmission of several independent MPEG2-TS on a MSR ring. The order of transmission of information in all diagrams is first from left to right and then from top to bottom. Within each octet or octet the Most Significant Bit (MSB) is transmitted first.

A.1 MPEG Physical Interface (MPI)

The physical characteristics of this interface shall follow the specification given in EN 50083-9. Three different types of interfaces are specified:

The Synchronous Parallel Interface (SPI);

The Synchronous Serial Interface (SSI);

The Asynchronous Serial Interface (ASI).

The interfaces use the MPEG2-TS Packet structure (188 octets). For the SPI and the SSI, the 204 octet format may be used for the transmission of 188-octet MPEG2-TS packets with 16 dummy octets. In order to prevent alarms being raised and failures being reported during set-up procedures or if the input port is not in use (in the case of a multi-port equipment), the MPI function shall have the ability to enable or disable fault case declaration. The MPI shall be either monitored (MON) or not monitored (NMON). The state of MON or NMON is provisioned by the MSR equipment manager to the MPI via the Equipment Management Function.

Signal processing in the transmitter:

A.1.1 Recovery of MPEG2 packets

This function recovers the data octets and their clock from the received signals:

For the SPI, this recovery is based on the use of the Data (0-7), the DVALID, PSYNC and clock signals, as specified in paragraph 4.1 of EN 50083-9.

For the SSI interface, the processing includes optical receiver (for fiber-optic-based link) or coupling/impedance matching (for coaxial cable), amplifier/buffer, clock recovery and biphase decoding, serial to parallel conversion, as specified in annex A of EN 50083-9.

For the ASI interface, the processing includes optical receiver (for fiber-optic-based link) or coupling/impedance matching (for coaxial cable), amplifier/buffer, clock/data recovery and serial-to-parallel conversion, FC comma deletion, 8B/10B decoding, as specified in annex B of EN 50083-9. In the next step, the recovery of the TS clock is performed (cf. annex E of EN 50083-9: implementation guidelines and deriving clocks from the MPEG2 packets for the ASI).

The function also realizes the sync acquisition of the MPEG2-TS packets on the basis of the method proposed in subclause 3.2 of ETR 290 (five consecutive correct sync octets for sync acquisition; two or more consecutive corrupted sync octets should indicate sync loss).

The packet size (188 octets or 204 octets) may be recovered from the received signals on the basis of the PSYNC signal for the parallel interface, or on the basis of periodicity of the synchronization octets for the serial interfaces. For the case of the Synchronous Parallel Interface and the SSI interface, the decision between 204-octet format for MPEG2-TS packets with 16 dummy octets MPEG2-TS packets can be made:

on the basis of the DVALID signal for the SPI: a high level during the last 16 octets indicate; or on the basis of the value of received synchronization octets for the SSI interface: 47H indicates 204-octet format with 16 dummy octets (paragraph A.3.2 of EN 50083-9). Dummy octets are discarded by the MPI function in the case of the 204-octet format with 16 dummy octets. The function passes the recovered MPEG2-TS packets and the timing information.

The function shall meet the electrical/optical characteristics, return loss and jitter requirements specified in EN 50083-9. This function shall also detect:

the absence of valid input signals;

the absence of clock;

a DVALID signal constantly low in the case of the Synchronous Parallel Interface (SPI).

If any of these defects is detected, a Loss Of Signal (LOS) is reported at the Element Management Function if the function is in MON state.

If a loss of synchronization of MPEG2-TS packets is detected according to the procedure proposed in the subclause 3.2 of ETR 290 (i.e. two or more consecutive corrupted sync octets are found), a TS-sync_loss error on the input signal (TSLE_I) is reported at the Element Management Function if the function is in MON state.

Performance Monitoring (End to End)

Errored blocks are detected on the basis of the transport_error_indicator present in the headers of the incoming MPEG2-TS packets, in accordance to ETR 290. A second filters perform a simple integration of errored blocks by counting during one second interval. The function generates the following performance parameters concerning the input MPEG2-TS signal received on the interface:

N_EBC_I: every second, the number of errored blocks within that second is counted as the Near-End Error Block Count (N_EBC_I).

N_DS_I: every second with at least one occurrence of TSLE_I or LOS (corresponding to the notion of Severely Disturbed Period introduced in ETR 290 [12]) shall be indicated as Near-End Defect Second (N_DS_I). If the function is in the MON state, at the end of each second interval, the contents of the N_EBC_I counter and of the N_DS_I indicator are reported to the EMF. Furthermore, on request of the EMF block, the MPI block evaluates and reports to the EMF the number of received MPEG2-TS packets within one second (BC_I).

A.1.2 Signal Processing in the Receiver a) Generation of the Signals at the MPEG Physical Interface This function receives the data bytes provided at the reference point b of FIG. 1 by the MAA block and recovers the synchronization of the MPEG2-TS packets on the basis of the method proposed in subclause 3.2 of ETR 290 (five consecutive correct sync bytes for sync acquisition; two or more consecutive corrupted sync bytes should indicate sync loss). The type of packet (MPEG2-TS packet) is determined on the basis of the periodicity of the synchronization bytes. After the recovery of the packet structure and only in the case of a MPEG2-TS packet structure, the function shall use the transport_error_indicator of the MPEG2-TS packets. The function determines the transmission format to be used at the output interface according to the following table 1:

TABLE 1

Transmission format of the output interface

| Type of packets received by the MPEG 2 Physical Interface block | | Transmission format on the physical interface |
|---|---|---|
| MPEG2-TS packets (188 octets) | SPI, SSI | 188-octet packets or 204-octet packets with 16 dummy octets, according to the parameter FORMAT provided by the Element Management Function block. |
| | ASI | 188-octet packets |

The function generates the appropriate signals at the output interface, according to the type of physical interface and to the transmission format selected:

For the Synchronous Parallel Interface (SPI), the function generates the Data (0-7), the DVALID, PSYNC and clock signals, as specified in paragraph 4.1 of EN 50083-9.

For the SSI interface, the processing includes parallel to serial conversion, biphase coding, amplifier/buffer and optical emitter (for fiber-optic-based link) or coupling/impedance matching (for coaxial cable), as specified in annex A of EN 50083-9.

For the ASI interface, the processing includes 8B/10B coding, FC comma symbols insertion, parallel-to-serial conversion, amplifier buffer and optical emitter (for fiber-optic-based link) or coupling/impedance matching (for coaxial cable), as specified in annex B of EN 50083-9. The function shall meet the electrical/optical characteristics, return loss and jitter requirements specified in EN 50083-9.

If a loss of synchronization of MPEG2-TS packets is detected according to the procedure proposed in the subclause 3.2 of ETR 290 (i.e. two or more consecutive corrupted sync octets are found), a TS-sync_loss error for the output signal (TSLE_O) is reported at the Element Management Function if the function is in MON state.

Performance Monitoring (End to End)

Errored blocks are detected on the basis of the transport_error_indicator present in the headers of the MPEG2-TS packets regenerated in the MPI block, in accordance to ETR 290. One second filters perform a simple integration of errored blocks by counting during one second interval. The function generates the following performance parameters concerning the output MPEG2-TS signal delivered by the interface:

N_EBC_O: every second, the number of errored blocks within that second is counted as the Near-End Error Block Count (N_EBC_O).

N_DS_O: every second with at least one occurrence of TSLE_O or LOS (corresponding to the notion of Severely Disturbed Period introduced in ETR 290) shall be indicated as Near-End Defect Second (N_DS_O). If the function is in the MON state, at the end of each second interval, the contents of the N_EBC_O counter and of the N_DS_O indicator are reported to the Element Management Function. Furthermore, on request of the Element Management Function block, the MPI block evaluates and reports at the Element Management Function the number of received MPEG2-TS packets within one second (BC_O).

For the detailed description, please refer to EN 50083-9 and ETR 290.

Appendix I

An Example of Ethernet Data Processing in the Case of SDH/SONET Based Aggregate Pipe The MSRP processing is divided into transmit and receive processing as follows:

I.1 The MSRP Transmit Processing

1) Receive MAC frame through MI or GMII from MAC and detect the SPD (Start Packet Delimiter);
2) Synchronize it to the SDH clock;
3) Add start flag (0x7e) of MSRP frame;
4) Add destination NA, Time-to-Live, U/M/B, FWR/SWR, Priority, TT and TSN fields to the MSRP packet;
5) FCS generation over destination NA, Time-to-Live, U/M/B, FWR/SWR, Priority, TT, TSN and payload fields to the MSRP packet, it does not include the Flag, Inter-frame gap, Rate Adaptation sequence, and Abort sequence (0x7d7e, option) octets;
6) Transparency processing or octet stuffing within the MSRP packet:

0x7e>0x7d, 0x5e;

0x7d>0x7d, 0x5d;

Octet stuffing does not occur during the transfer of Rate Adaptation sequence, Abort sequence, Flag;

7) If needed, add the rate-adaptation octet(s) "0xdd" within the MSRP packet by sending sequence(s) of {0x7d, 0xdd};
8) Add end flag (0x7e) of MSRP frame;
9) Add IPG (Inter-Packet-Gap) fill octet(s) (0x7e), if needed;
10) Scramble all octets before send to SDH payload.

1.2 The MSRP Receive Processing

1) De-scramble all octets before processing;
2) Remove IPG (Inter-Packet-Gap) fill octet(s) (0x7e) if needed;
3) Detect start flag (0x7e) of MSRP Packet;
4) Remove the rate-adaptation octet(s) "0xdd" within the MSRP Packet when detecting sequence(s) of {0x7d, 0xdd};
5) Perform octet removal (transparency processing), within the MSRP Packet:

0x7d, 0x5e>0x7e;

0x7d, 0x5d>0x7d;

6) Check for validation of the destination NA, Time-to-Live, U/M/B, FWR/SWR, Priority, TT and TSN fields;
7) Perform the FCS generation and checking;
8) Detect closing flag (0x7e);
9) Synchronize the MAC frame to MII RX_CLK;

10) Add preamble and SPD (Start Packet Delimiter) and send it to MAC through MII or GMII.

I.3 Erroneous Frame Handling

The MII or GMII Interface provides a method by which the MAC device could indicate to the MSRP entity by TX_ERR when a particular packet contains errors and should be aborted or discarded.

The Ethernet over SDH/SONET using MSRP supports two options for aborting an erroneous packet.

The first option is to abort a packet by inserting the abort sequence, 0x7d7e. Reception of this code at the far end will cause the receiver to discard this packet (the Abort sequence octets are also scrambled).

For the second option, the MSRP entity can also abort an erroneous packet by simply inverting the FCS octets to generate an FCS error. The selection of abort mode is controlled via the management interface.

An invalid packet is a packet which:
a) is not properly bounded by two flags; or
b) has fewer than sixteen octets between flags of packets; or
c) contains a FCS error; or
d) contains a NA, U/M/B, TT or TSN which are mismatched or not supported by the receiver.
e) has an invalid control sequence, i.e. {0x7d, ZZ} where ZZ octet is not 5d, 5e, 7e, dd (Rate Adaptation).

Invalid packets shall be discarded without notification to the sender. No action is taken as the result of that packet.

INDUSTRIAL APPLICABILITY

If this invention is applied, in comparison with SDH/SONET ADM (Add and Drop Multiplex), it has the following advantages:
(1) Short configuration and provisioning cycle for end-to-end Tributary services, MSR does work by sending data packet, network management and control signaling packet in both FWR and SWR. DCC (data communication channel) (Regeneration section D1-D3 bytes, Multiplex section DCC D4-D12 bytes) is not needed;
(2) MSR uses Regeneration section, Multiplex section and concatenation of High Order Virtual Container. The equipment layers are simplified.
(3) It is low cost and efficient for packet to map to contiguous concatenation and virtual concatenation of HOVC (High Order Virtual Container).
(4) Support of synchronous clock network is needed also but not heavily since LOVC pointer processing is not needed.
(5) MSR does not use TMN (telecom management network) to implement network management. Instead, it provides SNMP (simple network management protocol) and associated MIB (Management Information Base).

If this invention is applied, in comparison with LAPS and GFP, it has the following advantages:
(1) MSR uses packet based statistic multiplex. Bandwidth of aggregate pipe is full made use of by packets of multiple services.
(2) Dynamic bandwidth allocation of packet based is used.
(3) MSR can provide point-to-point connection, multicast and broadcast transferring functions.
(4) MSR can provide Topology Discovery, Layer 2 Protection Switch, Node insertion and deletion.

If this invention is applied, in comparison with RPR, it has the following advantages:

(1) Support of adding and dropping tributary is for renting.
(2) Ethernet, Gigabit Ethernet, DVB, ATM, POS and layer 3 forwarding of network processor can be used to access to MSR nodes.
(3) Implementation of multiple services in a node of ring is located to layer 2. So the use of MSR will increase performance.
(4) MSR can provide Tributary of both RPR and MSR at the same time.
(5) It does not like RPR using public MAC (Media Access Control) address and will have resource assignment issue of MAC address. MSR node machine uses non-global and local node address to identify MSRP entity.
(6) MSR does work by sending data packets and corresponding control packet in FWR, sending data packets and corresponding control packet in SWR. But in case of single fiber cut (e.g. outer ring), corresponding control packet sending in FWR or SWR ring does know where is fault.

The invention claimed is:

1. A data transmission apparatus used in a packet-based node of a multiple service ring including at least two packet-based nodes, said apparatus comprising:
a first working ring input for receiving data frames including a destination node address, a tributary service type and port identifier indicating a tributary service type and port of a destination tributary, and a first actual data, from a first upstream neighbor node;
a first RX framing means for deframing said data and extracting said destination node address, said tributary service type and port identifier, and the first actual data;
a first RX filtering means for identifying whether said data are for the local node according to said destination node address;
a first receiving service processing means for determining the service type destined for said data based on said tributary service type and port identifier when said data are for the local node;
a tributary TX framing means for converting said data to a format of a service specified by said tributary service type; and
a plurality of tributary ports for outputting the converted data, and said converted data being output to one of said tributary ports which is designated by said tributary service type and port identifier.

2. The data transmission apparatus according to claim 1, wherein said tributary ports receive
data from at least one input tributary service;
a tributary RX framing means for deframing the data from the input tributary service and extracting a destination node and actual tributary data;
a transmitting service processing means for generating a destination node address based on said extracted destination node and generating a tributary service type and port identifier based on the type of said input tributary service and a predetermined destination tributary port;
a first TX framing means for encapsulating said actual tributary data, said destination node address, said generated tributary service type and port identifier, into frames to be transmitted to a first downstream neighbor node; and
a first working ring output for outputting said data frames to said first downstream neighbor node.

3. The data transmission apparatus according to claim 2, further comprising a first TX scheduling means for scheduling transmission of data packets to other nodes.

4. The data transmission apparatus according to claim 3, wherein when said first RX filtering means determines that the received data are not for the local node, the received data are forwarded to the first TX scheduling means so as to be transmitted to another node.

5. The data transmission apparatus according to claim 4, wherein said data received from the first working ring input further includes a cast-type identifier, and said apparatus further comprises a first cast type determining means for determining whether the received data are of unicast, multicast or broadcast type, if said cast type identifier indicates multicast or broadcast, said received data are forwarded to said TX scheduling means so as to be transmitted to another node; and if said cast type identifier indicates unicast, the received data are sent to said receiving service processing means.

6. The data transmission apparatus according to claim 2, further comprising:
a second working ring input for receiving data frames including a destination node address, a tributary service type and port identifier indicating a service type and port of a destination tributary, and a second actual data, from a further upstream neighbor node;
a second RX framing means for deframing said data frames and extracting said destination node address, said tributary service type and port identifier, and the second actual data;
a second RX filtering means for identifying whether said second actual data are for the local node according to said destination node address;
a second receiving service processing means for determining the service type destined for said second actual data based on said tributary service type and port identifier when said second actual data are for the local node;
wherein said second actual data from said second receiving service processing means are sent to the tributary TX framing means for converting said second actual data to a format of a service specified by said service type, and the converted data are output to one of said tributary ports which is designated by said tributary service type and port identifier.

7. The data transmission apparatus according to claim 6, further comprising:
a second TX framing means for encapsulating said data from the input tributary service, said destination node address, said predetermined tributary service type and port identifier, into frames to be transmitted to a second downstream neighbor node; and
a second working ring output for outputting said data frames to said second downstream neighbor node.

8. The data transmission apparatus according to claim 7, further comprising a second TX scheduling means for scheduling transmission of data packets to other nodes in the second working ring.

9. The data transmission apparatus according to claim 8, wherein when said second RX filtering means determines that the received data are not for the local node, the received data are forwarded to the second TX scheduling means so as to be transmitted to another node in the second working ring.

10. The data transmission apparatus according to claim 9, wherein said data received from the second working ring input further includes a cast-type identifier, and said apparatus further comprises a second cast type determining means for determining whether the received data are of unicast, multicast or broadcast type, if said cast type identifier indicates multicast or broadcast, said received data are forwarded to said second TX scheduling means so as to be transmitted to another node; and if said cast type identifier indicates unicast, the received data are sent to said second receiving service processing means.

11. The data transmission apparatus according to claim 10, wherein said tributary service type and port identifier includes TT(tributary type) and TSN(tributary sequence No.), and each of said data frames from the first working ring input and second working ring input is 4-octet based, and includes 32 bits of the destination node address NA, next 32 bit definition field including TTL(time to live) indicator, cast type indicator U/M/B, a first working ring or second working ring indicator FWR/SWR, priority indicator, TT and TSN, and control signalling network management identifier(CS&NM) data, N(integer)*32bits of payload or parameters of CS & NM packets as said actual data, and 32 bits of FCS field.

12. The data transmission apparatus according to claim 11, wherein said first and second RX filtering means check TTL, FCS and NA of packets and perform XOR function with local NA to determine if the packets are for the local node, the packet will be taken away and discarded if TTL is zero or FCS is error.

13. The data transmission apparatus according to claim 12, wherein said receiving service processing means determine if the values of TT and TSN are illegal, if yes, discard the data frame, if legal, then determine the tributary service type for said data based on the TT and determine the sequence number of tributary TSN.

14. The data transmission apparatus according to claim 1, wherein said tributary service type and port identifier includes TT(tributary type) and TSN(tributary sequence No.), and said data transmission apparatus comprising a mapping table including available values of TT and TSN of the nodes in the multiple service ring and TCCR(tributary cross-connection relationship) between the nodes in the multiple service ring.

15. The data transmission apparatus according to claim 14, wherein said first working ring and second working ring form an aggregate pipe.

16. The data transmission apparatus according to claim 15, wherein said tributary services include at least one of MSR(multiple service ring), Ethernet, GE(GigaEthernet, ATM(asynchronous transfer mode), DVB(digital video broadcast), POS(Packet Over SONET/SDH), RPR(Resilient Packet Ring), L3 packet forwarding and CS & NM (Control Signaling and Network Management).

17. The data transmission apparatus according to claim 16, wherein said first working ring and second working ring are of SDH/SONET or GE/10GE Ethernet, and said apparatus comprises a buffer at the RX framing means side for rate adaptation, and a buffer at the TX framing means side for rate adaptation.

18. The apparatus according to claim 17, further comprising a L2PS means for detecting link status, if neither flag nor packet are received by a node in Rx direction within a predetermined time period in the FWR or SWR of aggregate pipe, or if fiber facility or a node is failure (e.g. PSD or PSF), two nodes on failure span will enter L2PS State.

19. The apparatus according to claim 17, further comprising a topology discovery means as a data link control function in the MSRP, for finding out who is its neighbor and how many nodes is been working on the MSR to ensure that transmitted packet must be received by same station, and that destination address of packet is pointed to itself, each station appends its NA as parameter to this Topology Discovery Packet by order, updates the length of parameter and passes this packet to the neighbor along the MSR ring, and each node performs topology discovery function periodically by sending topology discovery packet on the first or second working ring.

20. The data transmission apparatus of claim 1, wherein the data transmission apparatus is included in a resilient multiple service ring system comprising a plurality of nodes, and each of said nodes is assigned a node address (NA), and data incoming to a node contains a destination node address, and said destination node address is XOR'ed with the NA of the local node to check for match or mismatch.

21. A resilient multiple service ring system of claim 20 wherein said data transmission apparatus further comprising:
at least one tributary input for receiving data from at least one tributary service;
a first tributary RX framing means for deframing the data from the tributary service and extracting a destination node and actual tributary data;
a first transmitting service processing means for generating a destination node address based on said destination node and generating a service type identifier based on the type of said input tributary service;
a first TX framing means for encapsulating said actual tributary data, said destination node address, said service type identifier, into frames to be transmitted to a first downstream neighbor node; and
a first working ring output for outputting said data frames to said first downstream neighbor node.

22. The resilient multiple service ring system of claim 20, wherein said data transmission apparatus further comprising:
a second working ring input of a second working ring, the second working ring input for receiving data frames including a destination node address, a service type identifier, and a second actual data, from a further upstream neighbor node;
a second RX framing means for deframing said data frames and extracting said destination node address, said service type identifier, and the second actual data;
a second RX filtering means for identifying whether said data are for the local node according to said destination address;
a second receiving service processing means for determining the service type destined for said data based on said service type identifier when said data are for the local node;
wherein said data from said second receiving service processing means are sent to the tributary TX framing means for converting said data to a format of a service specified by said service type, and the converted data are outputted to a tributary service corresponding to said service type via a corresponding tributary output.

23. The resilient multiple service ring system of claim 20, wherein said data transmission apparatus further comprising:
a second TX framing means for encapsulating said data from tributary, said destination node address, said service type identifier, into frames to be transmitted to a second downstream neighbor node; and
a second working ring output for outputting said data frames to said second downstream neighbor node.

24. The resilient multiple service ring system of claim 20, wherein said tributary services of said data transmission apparatus include at least one of MSR (multiple service ring), Ethernet, GE (GigaEthernet, ATM (asynchronous transfer mode), DVB (digital video broadcast), POS (Packet Over SONET/SDH), RPR (Resilient Packet Ring), L3 packet forwarding and CS & NM.

25. The resilient multiple service ring system of claim 22, wherein said first working ring and second working ring of said data transmission apparatus are of SDH/SONET or GE/10GE Ethernet, and said apparatus comprises a buffer at the RX framing means side for rate adaptation, and a buffer at the TX framing means side for rate adaptation.

26. A data transmission method used in a packet-based node of a multiple service ring including at least two packet-based nodes, comprising the steps of:
receiving data frames including a destination node address, a tributary service type and port identifier indicating a tributary service type and port of a destination tributary, and actual data, from a upstream neighbor node via a first working ring input;
deframing said data and extracting said destination node address, said tributary service type and port identifier, and the first actual data;
performing RX filtering to identify whether said data are for the local node according to said destination node address;
determining the service type destined for said data based on said tributary service type and port identifier when said data are for the local node;
converting said data to a format of a service specified by said tributary service type; and
outputting the converted data to one of a plurality of tributary ports which is designated by said tributary service type and port identifier.

27. The method according to claim 26, further comprising the steps of:
receiving data from at least one input tributary service from said tributary ports;
deframing the data received from the input tributary service and extracting a destination node and actual tributary data;
generating a destination node address based on said extracted destination node and generating a tributary service type and port identifier based on the type of said input tributary service and a predetermined destination tributary port;
encapsulating said actual tributary data, said generated destination node address, said generated tributary service type and port identifier, into frames to be transmitted to a first downstream neighbor node; and
outputting said data frames to said first downstream neighbor node via a first working ring output.

28. The method according to claim 27, further comprising a TX scheduling step for scheduling transmission of data packets to other nodes.

29. The method according to claim 28, wherein when said RX filtering step determines that the received data are not for the local node, the received data are forwarded to the TX scheduling step so as to be transmitted to another node.

30. The method according to claim 29, wherein said data received from the first working ring input further includes a cast-type identifier, and said method further comprises a cast type determining step for determining whether the received data are of unicast, multicast or broadcast type, if said cast type identifier indicates multicast or broadcast, said received data are forwarded to said TX scheduling step so as to be transmitted to another node; and if said cast type identifier indicates unicast, the received data are sent to said receiving service processing step.

31. The method according to claim 27, further comprising:

receiving data frames including a destination node address, a tributary service type and port identifier indicating a service type and port of a destination tributary, and a second actual data, from a second upstream neighbor node via a second working ring input;

deframing said data frames and extracting said destination node address, said tributary service type and port identifier, and the second actual data;

performing further RX filtering to identify whether said data are for the local node according to said destination node address;

determining the service type destined for said second actual data based on said tributary service type and port identifier when said second actual data are for the local node; and converting said second actual data from second working ring to a format of a service specified by said service type, and the converted second actual data are output to one of said tributary ports which is designated by said tributary service type and port identifier.

32. The data transmission method according to claim 31, further comprising the steps of:

encapsulating said data from the input tributary service, said destination node address, said predetermined tributary service type and port, into frames to be transmitted to a second downstream neighbor node; and outputting said data frames to said second downstream neighbor node via a second working ring output.

33. The data transmission method according to claim 32, further comprising the step of: performing further scheduling to schedule transmission of data packets to other nodes in the second working ring.

34. The method according to claim 33, wherein when said further RX filtering step determines that the received data are not for the local node, the received data are forwarded to the further TX scheduling step so as to be transmitted to another node in the second working ring.

35. The method according to claim 34, wherein said data received from the second working ring input further includes a cast-type identifier, and said method further comprises the steps of: determining whether the received data are of unicast, multicast or broadcast type, if said cast type identifier indicates multicast or broadcast, said received data are forwarded to said further TX scheduling step so as to be transmitted to another node; and if said cast type identifier indicates unicast, the received data are sent to said further receiving service processing step.

36. The method according to claim 35, wherein said tributary service type and port identifier includes TT(tributary type) and TSN(tributary sequence No.), and each of said data frames from the first working ring input and second working ring input is 4-octet based, and includes 32 bits of the destination node address NA, next 32 bit definition field including TTL(time to live) indicator, cast type indicator U/M/B, a first working ring or second working ring indicator FWR/SWR, priority indicator, TT and TSN, and control signalling network management identifier(CS&NM) data, N(integer)*32bits of payload or parameters of CS & NM packets as said actual data, and 32 bits of FCS field.

37. The method according to claim 36, wherein said address filtering step check TTL, FCS and NA of packets and perform XOR function with local NA to determine if the packets are for the local node, the packet will be taken away and discarded if TTL is zero or FCS is error.

38. The method according to claim 37, wherein said receiving service processing step determines if the values of TT and TSN are illegal, if yes, discard the data frame, if legal, then determine the tributary service type for said data based on the TT and determine the sequence number of tributary TSN.

39. The method according to claim 26, wherein said tributary service type and port identifier includes TT(tributary type) and TSN(tributary sequence No.), and said method further comprising a step of providing a mapping table including available values of TT and TSN of the nodes in the multiple service ring and TCCR(tributary cross-connection relationship) between the nodes in the multiple service ring.

40. The method according to claim 39, wherein said first working ring and second working ring form an aggregate pipe.

41. The method according to claim 40, wherein said tributary services include at least one of MSR(multiple service ring), Ethernet, GE(GigaEthernet, ATM(asynchronous transfer mode), DVB(digital video broadcast), POS (Packet Over SONET/SDH), RPR(Resilient Packet Ring), L3 packet forwarding and CS & NM.

42. The method according to claim 41, wherein said first working ring and second working ring are of SDH/SONET or GE/10GE Ethernet.

* * * * *

UNITED STATES PATENT AND TRADEMARK OFFICE
CERTIFICATE OF CORRECTION

PATENT NO. : 7,382,789 B2  Page 1 of 1
APPLICATION NO. : 10/504015
DATED : June 3, 2008
INVENTOR(S) : Shaohua Yu It is certified that error appears in the above-identified patent and that said Letters Patent is hereby corrected as shown below:

Column 40, line 43
In Claim 16, delete "(GigaEthernet," and insert -- (GigaEthernet), --

Column 41, line 66
In Claim 24, delete "(GigaEthernet," and insert -- (GigaEthernet), --

Column 42, line 15
In Claim 26, delete "a" and insert -- an --

Column 44, line 40
In Claim 41, delete "(GigaEthernet," and insert -- (GigaEthernet), --

Signed and Sealed this

Thirtieth Day of September, 2008

JON W. DUDAS
*Director of the United States Patent and Trademark Office*